(12) United States Patent
Okuyama et al.

(10) Patent No.: US 7,002,641 B2
(45) Date of Patent: Feb. 21, 2006

(54) PROJECTION DISPLAY APPARATUS WITH QUARTER PHASE DIFFERENCE PLATE AND PHASE COMPENSATION ELEMENT

(75) Inventors: Atsushi Okuyama, Saitama (JP); Tatsuo Chigira, Tochigi (JP); Masayuki Abe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 10/376,846

(22) Filed: Feb. 28, 2003

(65) Prior Publication Data
US 2003/0160925 A1 Aug. 28, 2003

(30) Foreign Application Priority Data
Feb. 28, 2002 (JP) ............................. 2002-054021

(51) Int. Cl.
*G02F 1/13363* (2006.01)
(52) U.S. Cl. ..................... 349/9; 349/117; 349/118; 349/120
(58) Field of Classification Search ................ 349/118, 349/9, 120
See application file for complete search history.

(56) References Cited

U.S. PATENT DOCUMENTS

| | | | |
|---|---|---|---|
| 4,889,412 A | 12/1989 | Clerc et al. | |
| 5,327,270 A | 7/1994 | Miyatake | |
| 5,576,854 A * | 11/1996 | Schmidt et al. | ................ 349/5 |
| 5,583,679 A | 12/1996 | Ito et al. | ..................... 348/118 |
| 5,973,759 A * | 10/1999 | Itoh et al. | ..................... 349/5 |
| 6,016,173 A * | 1/2000 | Crandall | ..................... 349/25 |
| 6,108,064 A | 8/2000 | Minoura et al. | |
| 6,181,400 B1 * | 1/2001 | Yang et al. | ................. 349/117 |
| 6,183,091 B1 * | 2/2001 | Johnson et al. | ............... 353/20 |
| 6,250,762 B1 * | 6/2001 | Kuijper | ...................... 353/20 |
| 6,331,060 B1 | 12/2001 | Yamamoto et al. | |
| 6,340,230 B1 | 1/2002 | Bryars et al. | |
| 6,388,718 B1 * | 5/2002 | Yoo et al. | ..................... 349/9 |
| 6,520,645 B1 | 2/2003 | Yamamoto et al. | |
| 6,565,419 B1 | 5/2003 | Nishio et al. | |
| 6,624,862 B1 | 9/2003 | Hayashi et al. | |
| 6,909,473 B1 * | 6/2005 | Mi et al. | ........................ 349/5 |

FOREIGN PATENT DOCUMENTS

| | | |
|---|---|---|
| EP | 0 898 196 | 2/1999 |
| EP | 0 899 605 | 3/1999 |
| EP | 0 993 203 | 4/2000 |
| JP | 62-210423 | 9/1987 |
| JP | 2-250026 | 10/1990 |
| JP | 8-50206 | 2/1996 |
| JP | 11-64852 | 3/1999 |
| JP | 11-133413 | 5/1999 |
| JP | 11-142836 | 5/1999 |
| JP | 2000-81619 | 3/2000 |
| JP | 2000-111864 | 4/2000 |
| JP | 2000-112020 | 4/2000 |
| JP | 2000-228439 | 8/2000 |
| JP | 2000-347177 | 12/2000 |
| JP | 2001-350132 | 12/2001 |

\* cited by examiner

*Primary Examiner*—Andrew Schechter
(74) *Attorney, Agent, or Firm*—Morgan & Finnegan, LLP

(57) ABSTRACT

There is disclosed a display apparatus including a polarizing beam splitter for splitting light from a light source, a reflective liquid crystal display element illuminated by light of a predetermined polarizing direction through the polarizing beam splitter, and a double refractive phase compensation element arranged between the polarizing beam splitter and the reflective liquid crystal display element.

9 Claims, 18 Drawing Sheets

PROJECTION DISPLAY APPARATUS WITH QUARTER PHASE DIFFERENCE PLATE AND PHASE COMPENSATION ELEMENT

BACKGROUND OF THE INVENTION

Field of the Invention

Conventionally, as a method for improving characteristics of an angle of a visual field in a liquid crystal display element, Japanese Patent Application Laid-Open Nos. 8-50206, 11-133413 and etc. have disclosed methods for improving contrast of transmissive liquid crystal display elements by adding anisotropic films. The method of Japanese Patent Application Laid-Open No. 8-50206 is for improving an asymmetric contrast reduction in a twisted part of liquid crystal molecules of a twist nematic liquid crystal, which has been widely used for an image projector using a transmissive liquid crystal display element. The method of Japanese Patent Application Laid-Open No. 11-133413 is for improving a contrast reduction in a vertically oriented liquid crystal display element by setting anisotropic films different in refraction in three axial directions (nx, ny, nz) shown in FIG. 24 in a manner shown in FIG. 25, which is an example of being applied to a direct-view liquid crystal image display apparatus. In FIG. 25, a reference numeral 105 denotes a transmissive liquid crystal display element. Reference numerals 101, 102 denote polarizing plates, and 106, 107 denote axial directions of transmission of polarized lights of the respective polarizing plates 101, 102. The axial directions 106, 107 are set to cross each other. Reference numerals 103, 104 denote phase difference compensation elements disposed between a liquid crystal panel 105 and the polarizing plates 101, 102. Reference numerals 108, 109 denote directions of maximum refractive indexes of the respective phase difference compensation elements 103, 104.

Now, if a reflective liquid crystal display element is used as the liquid crystal display element of the image projector, an incident plane and an outgoing plane of light are the same, and the light goes and return through a liquid crystal layer in the reflective liquid crystal display element. In this case, even if the liquid crystal layer has a twisted constitution similar to that of the twist nematic liquid crystal, an asymmetric contrast reduction is not noticeable, but a contrast reduction occurs due to symmetric refractive-index anisotropy of the liquid crystal. Thus, in the display apparatus using the reflective liquid crystal display element, the symmetric refractive-index anisotropy of the liquid crystal must be corrected in order to form a high contrast image.

The image projector using the reflective liquid crystal display element adopts a constitution where only illumination light of a predetermined polarizing direction is guided to the reflective liquid crystal display element by a polarizing beam splitter, and the light reflected by the reflective liquid crystal display element is analyzed by the polarizing beam splitter. A reference (reference plane) of a polarizing direction of light made incident on the reflective liquid crystal display element is decided by a reference axis O of an illumination optical system and a reflection plane of the polarizing beam splitter PBS. Specifically, as shown in FIG. 5, a plane SS1 formed by a reference axis Oi before reflection on the reference plane RS and a reference axis Oo after the reflection, and a plane SS2 inclusive of the reference axis Oo and vertical to the plane SS1 respectively become reference planes of polarization.

On the aforementioned planes (reference planes of polarization) SS1, SS2, a polarizing direction of light rays made incident on the polarizing beam splitter PBS from an oblique direction other than a vertical or horizontal direction are inclined from the reference planes of polarization SS1, SS2 due to a geometrical relation between an incident direction of light rays and a polarizing separation plane of the polarizing beam splitter. Consequently, a contrast reduction occurs.

As described above, in the image projector using the reflective liquid crystal display element, a contrast reduction caused by the polarizing beam splitter and a contrast reduction caused by the reflective liquid crystal display element must be efficiently compensated for simultaneously.

SUMMARY OF THE INVENTION

A display apparatus of the present invention has the following constitutional feature.

The display apparatus comprises a light source; a reflector; an integrator including a lens array and a condenser optical system; a polarizing beam splitter; and a projection lens, wherein light from the light source is condensed by the reflector, the condensed light is separated into a plurality of luminous fluxes by the lens array, the plurality of illumination luminous fluxes are superposed by the condenser optical system to form a uniform illumination region, illumination light of a predetermined polarizing direction is guided to a reflective liquid crystal display element by the polarizing beam splitter disposed between the condenser optical system and the reflective liquid crystal display element, light reflected by the reflective liquid crystal display element is analyzed by the polarizing beam splitter, and guided to the projection lens to project an image by the projection lens, and wherein a ¼ phase difference plate and a double refractive phase compensation element are disposed between the polarizing beam splitter and the reflective liquid crystal display element and, from the light source side, the polarizing beam splitter, the ¼ phase difference plate, the double refractive (birefringence) phase compensation element, and the reflective liquid crystal display element are arranged in this order.

According to the foregoing arrangement, a phase advance (phase delay) axis of the ¼ phase difference plate is arranged to be vertical (or parallel) to a reference plane of polarization decided by the polarizing beam splitter and an illumination optical system. Additionally, a smallest refractive index axial direction of the double refractive phase compensation element is arranged to be parallel to a reference axis of the illumination system. Thus, it is possible to suppress contrast reduction by the polarizing beam splitter and a contrast reduction by the reflective liquid crystal display element.

In this case, if an outer shape of the lens array is rectangular, the luminous flux guided to the reflective liquid crystal display element by the polarizing beam splitter and the luminous flux to illuminate the reflective liquid crystal display element become converged luminous fluxes having rectangular sections (peripheral luminous flux has an angle with respect to main principal rays). Respective polarizing directions of the luminous fluxes guided from the polarizing beam splitter to the reflective liquid crystal display element are symmetrically distributed with respect to a reference plane of polarization (x direction in FIG. 6) as shown in FIG. 6, and the polarizing direction of each polarized light has an inclination in a Y axis as the light is shifted away from an X axis in a direction of the Y axis. Further, when the ¼ phase difference plate is operated, as shown in FIG. 7, each polarized light is converted into elliptic polarized light having a long axis in a direction of y axis (here, light on the X axis is still straight polarized light). Then, each polarized light is made incident on the double refractive phase compensation element (at this time, since each polarized light is converged light, the peripheral luminous flux still has an angle with respect to principal light rays). For respective polarized lights (elliptic polarized light, straight polarized light) converted by the ¼ phase difference plate, the double refractive compensation element adds a predetermined phase difference in accordance with an inclined angle between an incident axis of each polarized light and an optical axis indicating anisotropy of the refractive index elliptic member of the later-described double refractive phase difference compensation element, and ellipcity of the elliptic polarized light to compensate for a phase difference generated in the liquid crystal.

Now, explanation will be made of the anisotropy of the double refractive phase compensation element of the present invention.

The anisotropy of the double refractive phase compensation element of the present invention satisfies the following:

$$-0.8 > \delta c/\delta p > -3.0 \tag{1}$$

When refractive indexes of respective main axis directions of a refractive index elliptic member indicating the anisotropy of the double refractive phase compensation element are ncx, ncy, ncz, the following relations are established:

ncz<ncx, and ncz<ncy.

When a thickness of the double refractive phase compensation element is defined to be $d_1$ (dc=2×$d_1$), and an amount indicating a degree of anisotropy of the double refractive phase compensation member is defined to be δc, the following is established:

$$\delta c = (ncz - (ncx+ncy)/2) \times dc$$

When an amount indicating a degree of anisotropy of the reflective liquid crystal display element is defined to be δp, a thickness of a liquid crystal layer is defined to be $d_2$ (dp=2×$d_2$), and refractive indexes of main axis directions of a refractive index elliptic member of the liquid crystal layer are defined to be nx, ny, nz (nz is a plane normal direction, nx=ny), the following is established:

$$\delta p = (nz - nx) \times dp$$

In the double refractive phase difference compensation element of the present invention, its anisotropy is set to satisfy the conditional equation (1), and accordingly the phase difference generated in the liquid crystal layer can be canceled to improve contrast.

If a value of the conditional equation (1) is larger than an upper limit, a phase difference generated at the double refractive phase compensation element is small, and thus an effect of phase compensation is small. If a value of the conditional equation (1) is smaller than a lower limit, a phase difference generated at the double refractive phase compensation element is excessively large, and thus the amount of light in white displaying is reduced to lower brightness.

According to the present invention, in the equation (1), when its value is δc/δp=−1, a completely symmetrical constitution is realized. If a value of the equation (1) is in the range of −0.8>δc/δp>−1.2, a sufficient effect of the present invention can be obtained. If a value of the equation (1) is −1.2>δc/δp, a phase difference generated at the double refractive phase compensation element is subjected to excessive correction. However, at the image projector, illumination is carried out by a rectangular luminous flux and there is a great deal of light made incident from an oblique direction, and the double refractive phase compensation element mainly carries out phase compensation of light made incident from an oblique direction. Accordingly, also in this range, phase compensation of the present invention is effectively carried out.

Refractive index elliptic members (nx, ny, nz) indicating refractive indexes of a liquid crystal layer can be defined based on phase difference data obtained by directly measuring the reflective liquid crystal display element.

First, a method for measuring contrast characteristics of a liquid crystal will be described. For the measurement, a measurement system similar to that shown in FIG. 8 is used. In FIG. 8, a reference code LS denotes a light source, L is a lens, LCD is a reflective liquid crystal display element, PD is a light receiving element for measuring the amount of light, PO is a polarizer for adjusting a polarizing axis of light made incident on a panel, and AN is an analyzer.

As shown in FIG. 8, light from the light source LS is collimated into parallel lights by a lens L, made predetermined polarized lights by the polarizer PO, reflected by the reflective liquid crystal display element LDC, then analyzed by the analyzer AN, and made incident on the light receiving element PD.

At the reflective liquid crystal display element shown in FIG. 8, a coordinate system is defined in which a center of a region displaying a rectangular image is set as an origin, and directions of rectangular sides are set as x, y coordinates (in FIG. 8, an X axis is shown while a Y axis is not), and a z axis is set in a direction vertical to the reflective liquid crystal display element LCD. An incident angle θ is an angle formed between incident light rays and the z axis.

FIG. 9 is a view of projection of light rays made incident on the reflective liquid crystal display element LCD to an xy plane. In this case, an incident azimuth angle Φ represents an angle formed between the projecting direction of the incident light rays to the xy plane and the x axis. In FIG. 9, a reference numeral R1 denotes incident light from a direction of an incident azimuth angle Φ=0°. R1' denotes light of the incident light R1 reflected by the reflective liquid crystal display element LCD. R2 denotes incident light from an optional azimuth angle Φ direction. R2' denotes light of the incident light R2 reflected by the reflective liquid crystal display element LCD. Additionally, incident polarizing axial directions a, b of the incident lights R1, R2 are in the y axial direction.

By such a measuring apparatus (measurement system shown in FIGS. 8 and 9), incident light rays are set by using an incident azimuth angle Φ and an incident angle θ as parameters, and light intensity I0 measured in a parallel state of the analyzer AN to the polarizer PO and light intensity I1 measured in the vertical state of the analyzer AN to the polarizer PO are measured. C obtained by the following is a contrast value:

$$C = I0/I1$$

Actually, contrast values C0(θ), C90(θ), C135(θ), C180(θ), C225(θ), C270(θ), C315(θ) measured from directions of Φ=0, 45, 90, 135, 180, 225, 270, 315° are measured.

The contrast value is in a reciprocal relation to the amount of light leaked from the reflective liquid crystal display element when the reflective liquid crystal display element LCD is in a black displaying state. In this case, a phase difference value of the amount of polarized light leaked from the reflective liquid crystal display element is represented by a phase difference $\Gamma(\Phi, \theta)$. The phase difference $\Gamma(\Phi, \theta)$ is calculated in a state where an optical axis of the phase difference plate is inclined by 45° with respect to the x axis on the xy plane of the reflective liquid crystal display element. The code of the phase difference $\Gamma$ can be decided by making incident circularly polarized light in place of the straight polarized light at the measuring apparatus of FIG. 8, and based on a direction of a long axis of the elliptic polarized light converted by the phase difference of the reflective liquid crystal display element.

Next, a method for deciding anisotropy of the reflective liquid crystal element will be described.

Here, a refractive index elliptic member of a liquid crystal of the reflective liquid crystal display element is uniaxially defined where refractive indexes are different in a plane normal direction. FIG. 10 is a perspective view of an elliptic member, and FIGS. 11A and 11B respectively show a section of an xy plane and a section of a zy plane of the elliptic member. Reference codes nx, ny, nz denote refractive indexes of respective main axial directions of the refractive index elliptic member of the liquid crystal.

For the anisotropy of the uniaxial refractive index elliptic member, when the refractive index elliptic member is cut out on a plane vertical to a direction of advancing light in accordance with an incident azimuth angle, a short axis of an ellipse formed at the cut is defined as an optical axis of an ordinary ray direction "no", and a long axis of the ellipse formed at the cut is defined as an optical axis of an extraordinary ray direction "ne" (refer to "Principle of Optics" III–XIV by Born Wohlf). FIG. 12 shows ellipses at cuts when incident azimuth angles $\Phi$ are 0°, 45°, 90°, an ordinary ray direction no and an extraordinary ray direction ne, and a polarizing direction P of incident light. Accordingly, when lights are made incident at incident azimuth angles $\Phi$ of 0° (180°), 90° (270°), since the optical axis of the anisotropy of the refractive index elliptic member of the liquid crystal-coincides with the polarizing direction of the incident lights, no phase differences are generated by double refraction.

Here, in actual measurement, even in the case of the incidence from the aforementioned azimuth angles ($\Phi$ are 0° (180°), 90° (270°), since there is a reduction in the contrast value, a phase difference generated at the reflective liquid crystal display element $\Gamma(\Phi, \theta)$ is split into a phase difference $\Delta(\theta)$ and a phase difference $\delta(\theta)$.

The phase difference $\Delta(\theta)$ is a phase difference not by the azimuth angle $\Phi$, and obtained as an average of $\Gamma(0, \theta)$, $\Gamma(90, \theta)$, $\Gamma(180, \theta)$, $\Gamma(270, \theta)$. The phase difference $\delta(\theta)$ is a phase difference of an oblique direction, and obtained as a phase difference which is a result of subtracting the phase difference $\Delta(\theta)$ from an average measurement value $\Delta 45(\theta)$ of $\Gamma(45, \theta)$, $\Gamma(135, \theta)$, $\Gamma(225, \theta)$, $\Gamma(315, \theta)$ as follows:

$$\delta\theta = \Delta 45(\theta) - \Delta(\theta)$$

Therefore, the anisotropy of the reflective liquid crystal display element can be decided by assuming a refractive index of the uniaxial refractive index elliptic member to be (nx=ny, nz) for the reflective liquid crystal display element in the black displaying state, using a refractive index nz with respect to a predetermined refractive index nx (e.g., 1.5) as a parameter, calculating a phase difference of light made incident from an azimuth angle 45°, and obtaining a refractive index nz coincident with the phase difference $\delta(\theta)$ by the aforementioned measurement.

As described above, the display apparatus of the present invention has the constitutional feature that the ¼ phase difference plate and the double refractive phase compensation element disposed between the polarizing beam splitter and the reflective liquid crystal display element and, from the light source side, the polarizing beam splitter, the ¼ phase difference plate, the double refractive phase compensation element, and the reflective liquid crystal display element are arranged in this order.

In this case, the display apparatus of the present invention is characterized in that the phase advance (phase delay) axis of the ¼ phase difference plate is arranged to be vertical (or parallel) to the reference plane of polarization, and the smallest refractive index axial direction of the double refractive phase compensation element is arranged to be parallel to the reference axis of the illumination system. Here, the reference axis of the illumination system is an optical axis of a lens constituting the illumination system, and the reference plane of polarization is in a direction parallel to a plane including the reference axis of the illumination system and a reflected reference axis of the reference axis of the illumination system formed when the light is reflected on the polarizing separation surface of the polarizing beam splitter.

Additionally, the display apparatus of the present invention is characterized in that anisotropy of the double refractive phase compensation element satisfies the following:

$$-0.8 > \delta c/\delta p > -3.0 \quad (1)$$

In this case, when refractive indexes of respective main axis directions of a refractive index elliptic member indicating anisotropy of the double refractive phase compensation element are ncx, ncy, ncz, the following relations are established:

ncz<ncx, and ncz<ncy.

When a thickness of the double refractive phase compensation element is defined to be $d_1$ ($dc=2\times d_1$), and an amount indicating a degree of anisotropy of the double refractive phase compensation member is defined to be $\delta c$, the following is established:

$$\delta c = (ncz - (ncx + ncy)/2) \times dc$$

When an amount indicating a degree of anisotropy of the reflective liquid crystal display element is defined to be $\delta p$, a thickness of a liquid crystal layer is defined to be $d_2$ ($dp=2\times d_2$), and refractive indexes of main axial directions of a refractive index elliptic member of the liquid crystal layer are defined to be nx, ny, nz (nz is a plane normal direction, nx=ny), the following is established:

$$\delta p = (nz - nx) \times dp$$

In this case, the refractive indexes nx, ny, nz of the respective main axial directions of the refractive index elliptic member of the liquid crystal in the reflective liquid crystal display element are defined by phase differences obtained from contrast measurement of the reflective liquid crystal display element.

The present invention has a feature that a display apparatus comprises a polarizing beam splitter for splitting light from a light source; a reflective liquid crystal display element (liquid crystal panel) illuminated by light of a predetermined polarizing direction through the polarizing beam splitter; and a double refractive element arranged between the polarizing beam splitter and the reflective liquid crystal display element, the double refractive phase compensation element having an optical axis substantially parallel to principal rays of a luminous flux made incident on the reflective liquid crystal display element.

The present invention has a feature that a display apparatus comprises a polarizing beam splitter for splitting light from a light source; a plurality of reflective liquid crystal display elements (liquid crystal panels) illuminated by light of a predetermined polarizing direction through the polarizing beam splitter, the polarizing beam splitter synthesizing reflected lights from the plurality of reflective liquid crystal display elements; and a double refractive element (double refractive filter) arranged between the polarizing beam splitter and the reflective liquid crystal display elements, the double refractive element having an optical axis substantially parallel to principal rays of a luminous flux made incident on each of the reflective liquid crystal display elements.

In this case, the double refractive plate is characterized by improving contrast at a desired azimuth angle.

The present invention has a feature that a display apparatus comprises a polarizing beam splitter for splitting light from a light source; a reflective liquid crystal display element (liquid crystal panel) illuminated by light of a predetermined polarizing direction through the polarizing beam splitter; and a double refractive element (double refractive filter) arranged between the polarizing beam splitter and the reflective liquid crystal display element to improve contrast at a desired azimuth angle.

Furthermore, the present invention has a feature that a display apparatus comprises a polarizing beam splitter for splitting light from a light source; a plurality of reflective liquid crystal display elements (liquid crystal panels) illuminated by light of a predetermined polarizing direction through the polarizing beam splitter, the polarizing beam splitter synthesizing reflected lights from the plurality of reflective liquid crystal display elements; and a double refractive element (double refractive filter) arranged between the polarizing beam splitter and each of the reflective liquid crystal display elements to improve contrast at a desired azimuth angle.

In the foregoing display apparatus, preferably, the ¼ phase difference plate and the double refractive plate are supported by a holding frame having an opening.

DESCRIPTION OF THE PREFERRED EMBODIMENTS (First Embodiment)

Figure 1:
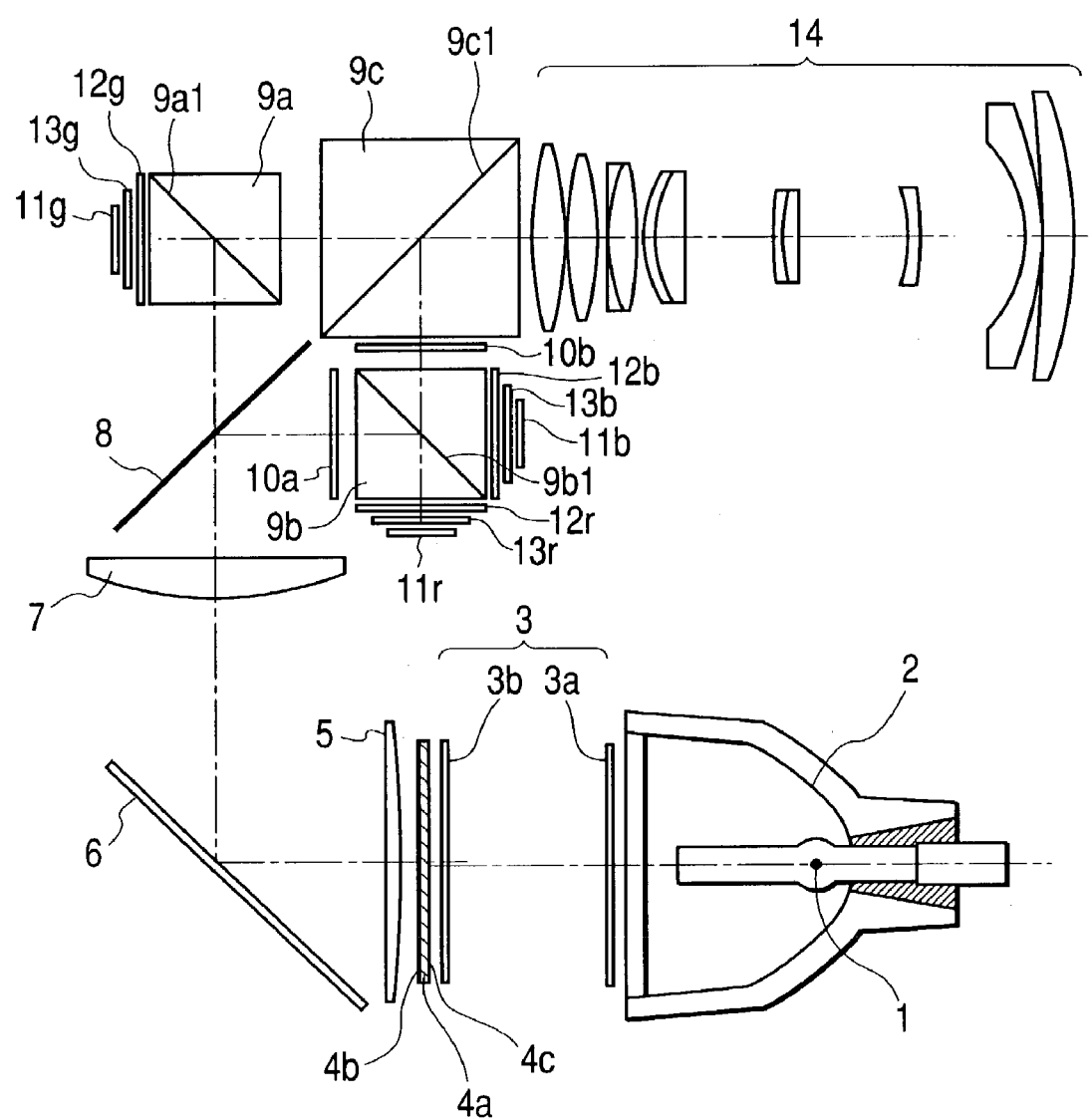
FIG. 1 is a constitutional view of an entire liquid crystal projector according to a first embodiment.

FIG. 1 shows a reflective image modulator according to a first embodiment of the present invention.

In FIG. 1, a reference numeral 1 denotes a light source constituted of a high-pressure mercury lamp, and 2 a reflector for radiating light from the light source 1 in a predetermined direction. A reference numeral 3 denotes an integrator for forming an illumination region having uniform illumination intensity, which is constituted of fly-eye lenses 3a, 3b. A reference numeral 4 denotes a polarizing conversion element for aligning nonpolarized light in a predetermined polarizing direction, which is constituted of a polarizing separation film 4a, a ½ phase difference plate 4b, and a reflection plate 4c. A reference numeral 5 denotes a condenser lens for condensing illumination light, 6 a mirror, 7 a field lens for making the illumination light telecentric light, and 8 a dichroic mirror for transmitting green wavelength region light. Reference numerals 9a1, 9b1, 9c1 denote polarizing separation films having characteristics of reflecting S polarized light and transmitting P polarized light, and 9a, 9b, 9c polarizing beam splitters respectively having the polarizing separation films 9a1, 9b1, 9c1. Reference numerals 10*a*, 10*b* denote color selective phase difference plates for converting (rotating) polarizing directions of lights of predetermined wavelength regions by 90°. Reference numerals 11*r*, 11*g*, 11*b* denote reflective liquid crystal display elements for reflecting incident illumination lights and modulating the lights in accordance with image signals to generate image lights. Reference numerals 12*r*, 12*g*, 12*b* denote ¼ phase difference plates. Reference numerals 13*r*, 13*g*, 13*b* denote uniaxial double refractive filters as double refractive phase difference compensation elements for correcting phase differences generated when the reflective liquid crystal display elements 11*r*, 11*g*, 11*b* are black displaying. A reference numeral 14 denotes a projection lens system.

Figure 2:
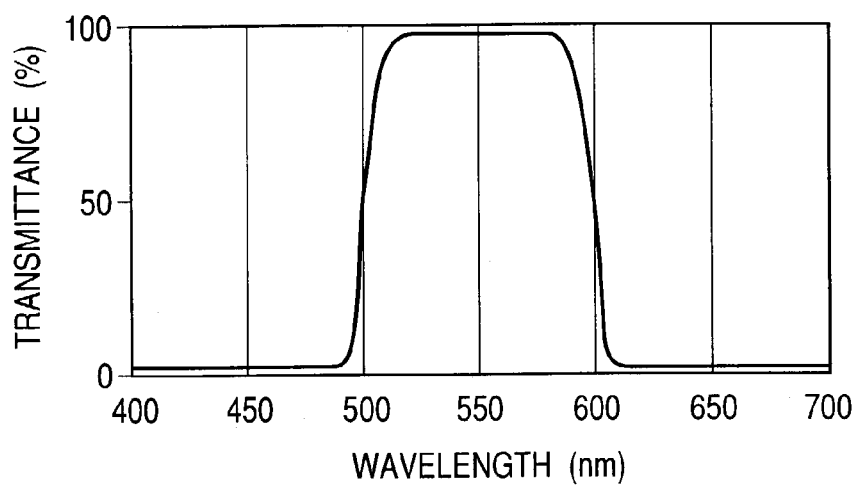
FIG. 2 is a characteristic view of a dichroic mirror of the first embodiment.
Figure 3:
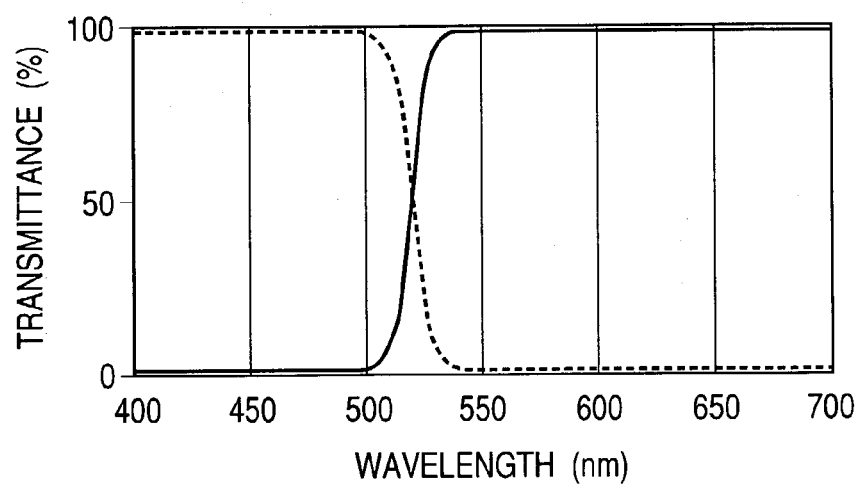
FIG. 3 is a characteristic view of a color selective filter of the first embodiment.

Next, an optical operation of the aforementioned constitution will be described. Light emitted from the light source 1 is condensed in the direction of the fly-eye lens 3*a* by the reflector 2. This luminous flux is divided into a plurality of luminous fluxes by the fly-eye lens 3*a*. Then, the plurality of luminous fluxes are superposed on the reflective liquid crystal display elements 11*r*, 11*g*, 11*b* by the operations of the fly-eye lens 3*b*, the condenser lens 5 and the field lens 7 to form illumination regions of uniform illumination intensity on the reflective liquid crystal display elements 11*r*, 11*g*, 11*b*. A number of luminous fluxes emitted from the fly-eye lens 3*b* at this time are separated into P polarized lights and S polarized lights by the polarizing separation films 4*a* corresponding to the respective luminous fluxes. Each P polarized light is converted into a polarized light component of the same direction as that of each S polarized light by the ½ phase difference plate 4*b*, and the S polarized light is reflected by the reflection film 4*c*. Accordingly, the number of lights emitted from the fly-eye lens 3*b* are emitted in the same direction as light having a predetermined polarizing direction. The lights converted into the S polarized lights substantially integrally by the polarizing conversion element 4 are made incident on the dichroic mirror 8 which transmits light of a green wavelength region (transmission curve is shown in FIG. 2). The light of the green wavelength regions is transmitted, while lights of red and blue wavelength regions are reflected. The green region light transmitted through the dichroic mirror 8 is made incident on the polarizing beam splitter 9*a*, reflected by the polarizing separation film 9*a*1, transmitted through the ¼ phase difference plate 12*g*, and further transmitted through the double refractive filter 13*g* to be made incident on the reflective liquid crystal display element 11*g*. On the other hand, for the red and blue wavelength region lights reflected by the dichroic mirror 8, only the blue wavelength region light is converted for its polarizing direction by 90° into P polarized light by the first color selective phase difference plate 10*a*, while the red wavelength region light is maintained as the S polarized light and made incident on polarizing beam splitter 9*b*. FIG. 3 shows characteristics of the first color selective phase difference plate 10*a*. In FIG. 3, a dotted-line curve indicates a transmittance of a polarizing direction (P polarized light) orthogonal to an incident polarizing direction, and a solid line indicates a transmittance of a polarizing direction (S polarized light) parallel to the incident polarizing direction.

The explanation is continued by returning to FIG. 1. On the polarizing separation film 9*b*1 of the polarizing beam splitter 9*b*, the blue wavelength region light which is P polarized light is transmitted, while the red wavelength region light which is S polarized light is reflected. Accordingly, the light is separated into the lights of the red and blue wavelength regions having polarizing directions orthogonal to each other. The red wavelength region light reflected by the polarizing beam splitter 9*b* is transmitted through the ¼ phase difference plate 12*r*, and further transmitted through the double refractive filter 13*r* to be made incident on the reflective liquid crystal display element 11*r*. The blue wavelength region light transmitted through the polarizing beam splitter 9*b* is transmitted through the ¼ phase difference plate 12*b*, and further transmitted through the double refractive filter 13*b* to be made incident on the reflective liquid crystal display element 11*b*.

Figure 4:
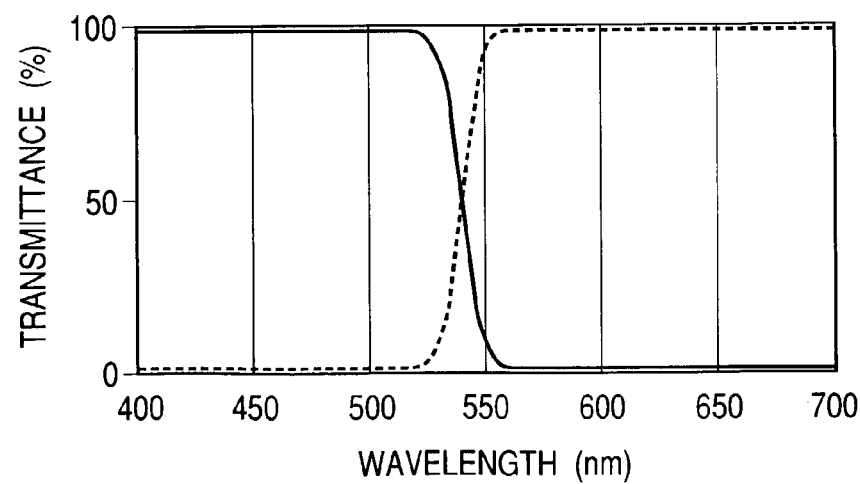
FIG. 4 is a characteristic view of the color selective filter of the first embodiment.
Figure 5:
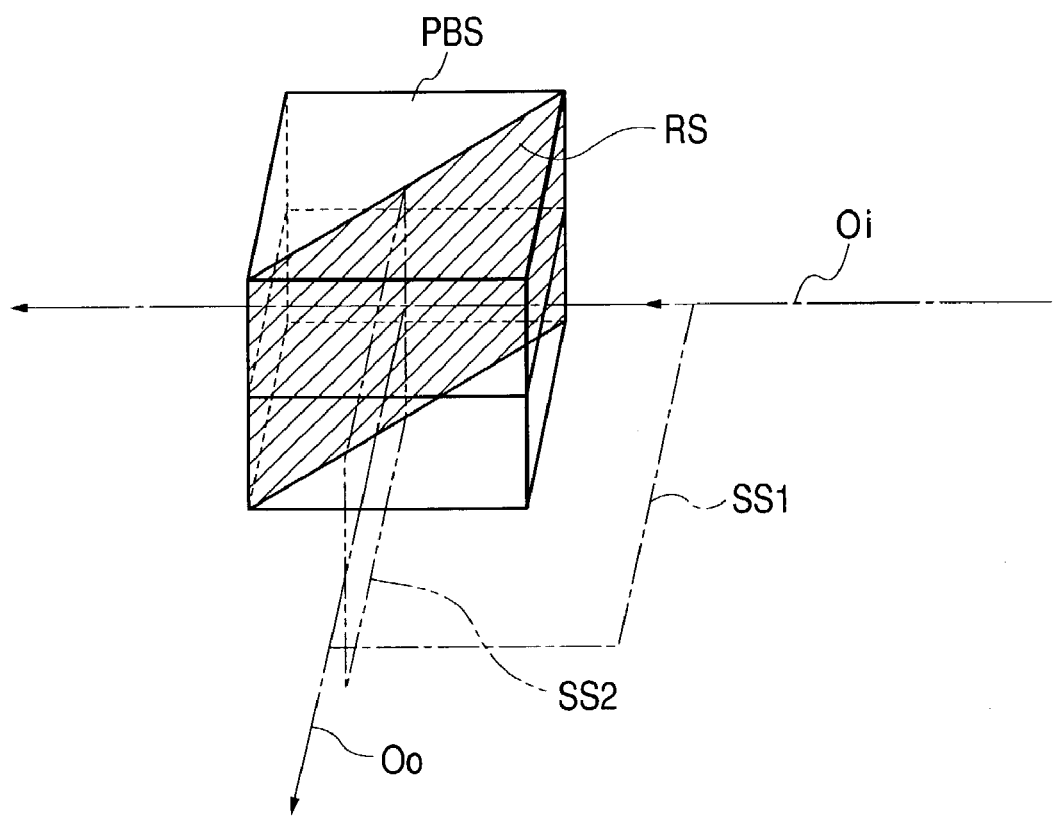
FIG. 5 is a view explaining a reference direction of polarization.
Figure 6:
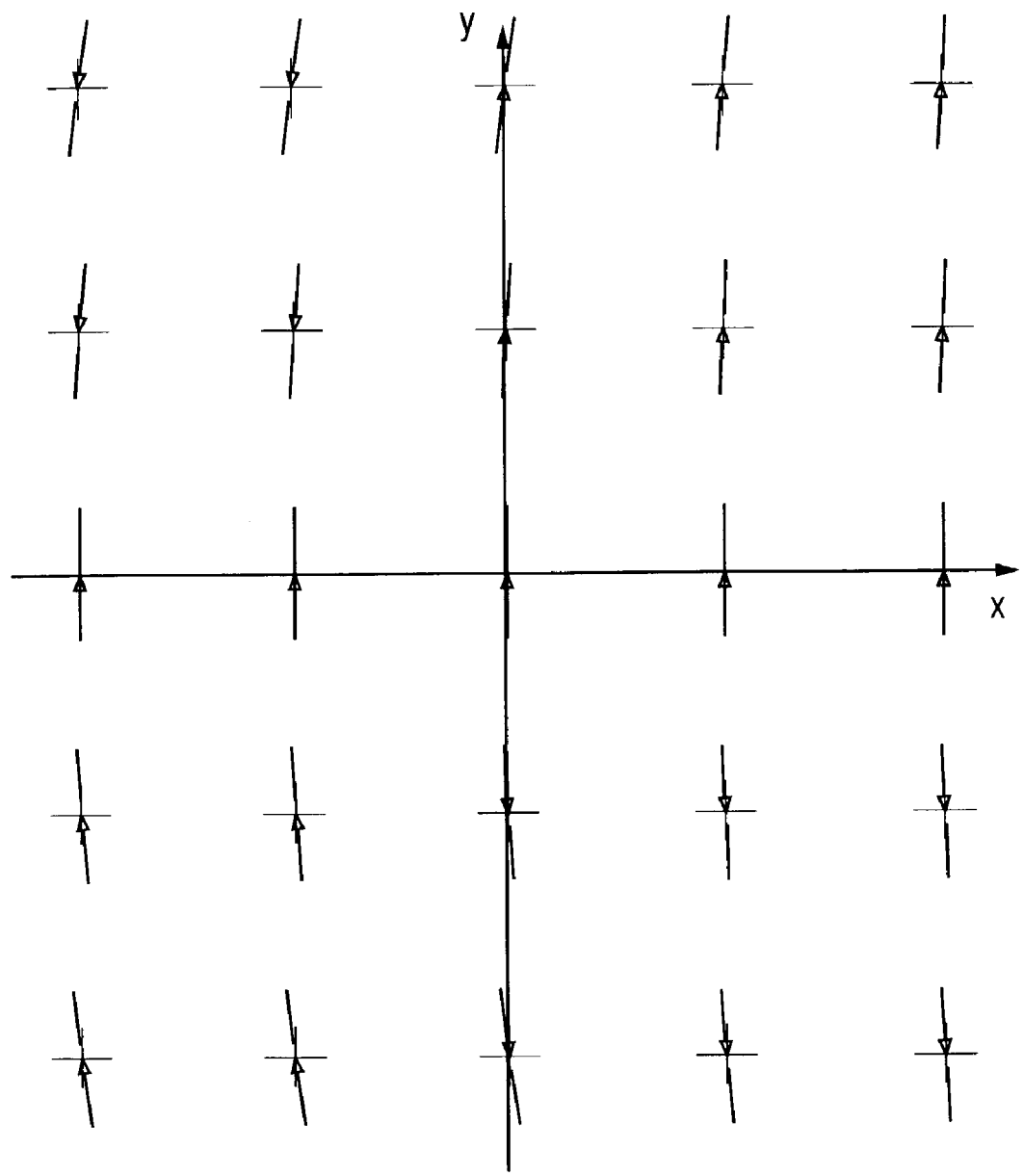
FIG. 6 is a view explaining a polarizing state of an illumination system.
Figure 7:
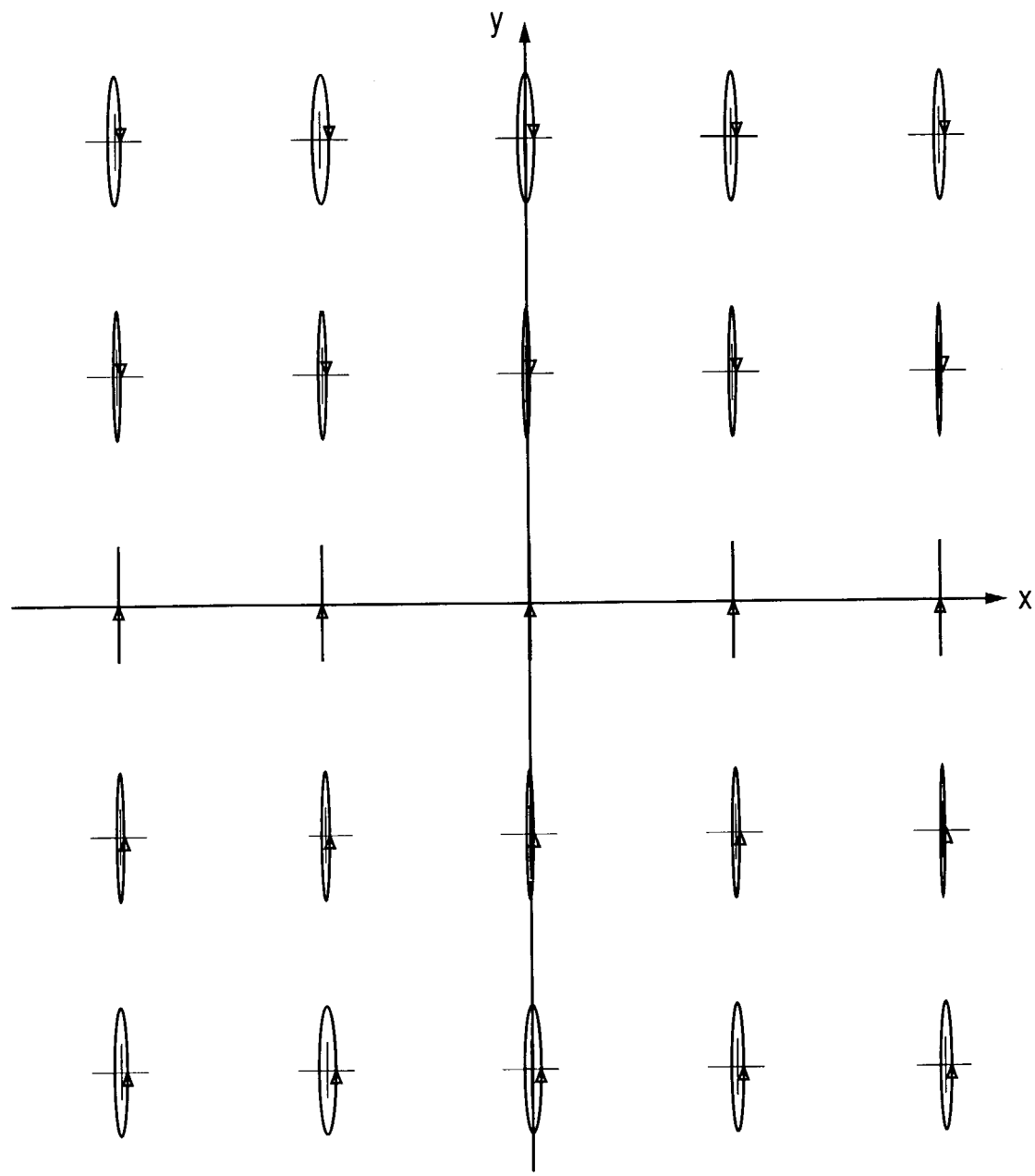
FIG. 7 is a view explaining a polarizing state of the illumination system.

Further, the green wavelength region light modulated and reflected by the reflective liquid crystal display element 11*g* is transmitted through the double refractive filter 13*g*, transmitted through the ¼ phase difference plate 12*g*, converted into P polarized light, and transmitted through the polarizing beam splitters 9*a*, 9*c*. Additionally, the red wavelength region light modulated and reflected by the reflective liquid crystal display element 11*r* is transmitted through the double refractive filter 13*r*, transmitted through the ¼ phase difference plate 12*r*, converted into P polarized light, transmitted through the polarizing beam splitter 9*b*, and made incident on the second color selective phase difference plate 10*b*. FIG. 4 shows characteristics of the second color selective phase difference plate 10*b*. A dotted-line curve indicates a transmittance of a polarizing direction orthogonal to an incident polarizing direction, and a solid line indicates a transmittance of a polarizing direction parallel to the incident polarizing direction.

The explanation is continued by returning to FIG. 1. The blue wavelength region light modulated and reflected by the reflective liquid crystal display element 11*b* is transmitted through the double refractive filter 13*b*, transmitted through the ¼ phase difference plate 12*b*, converted into S polarized light, reflected by the polarizing beam splitter 9*b*, and made incident on the second color selective phase difference plate 10*b*. For the red and blue wavelength region lights made incident on the second color selective phase difference plate 10*b* which converts only the red wavelength region light for its polarizing direction by 90°, only the red wavelength region light is converted for its polarizing direction by 90° into S polarized light by the second color selective phase difference plate 10*b*. The blue wavelength region light is maintained as S polarized light, made incident on the polarizing beam splitter 9*c* and reflected. Then, the lights of all the wavelength regions of RGB are synthesized by the polarizing beam splitter 9*c*, and guided to the projection lens 14 to be projected to a not-shown screen or the like.

Figure 8:
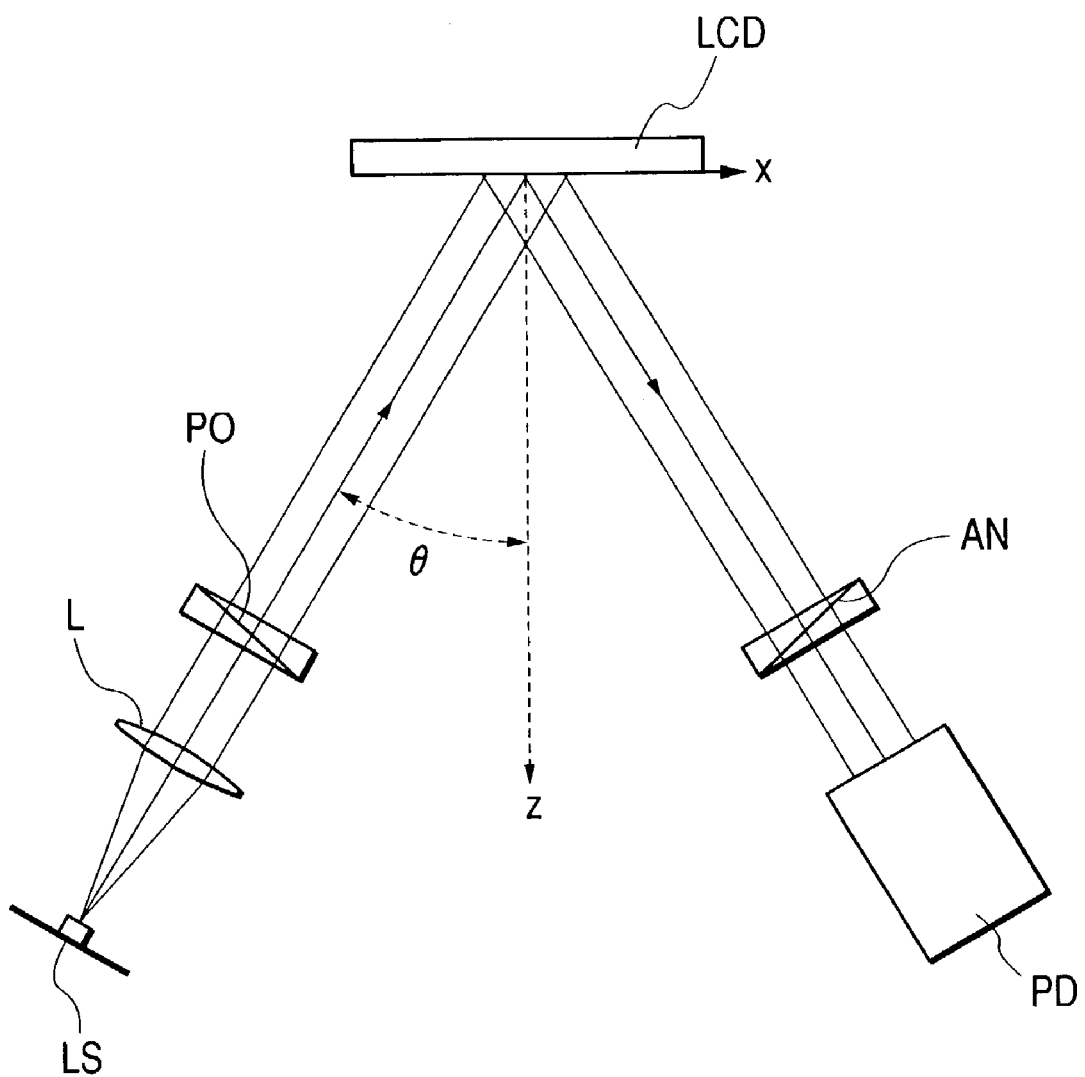
FIG. 8 is a view explaining a measurement system for measuring characteristics of a reflective liquid crystal display element.
Figure 9:
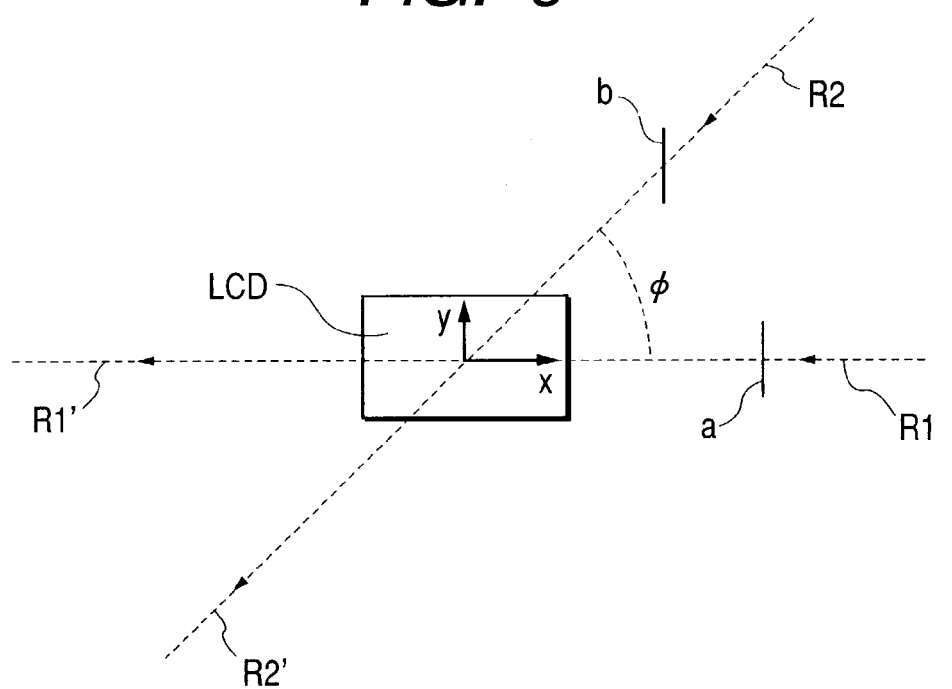
FIG. 9 is a view explaining an azimuth angle.
Figure 10:
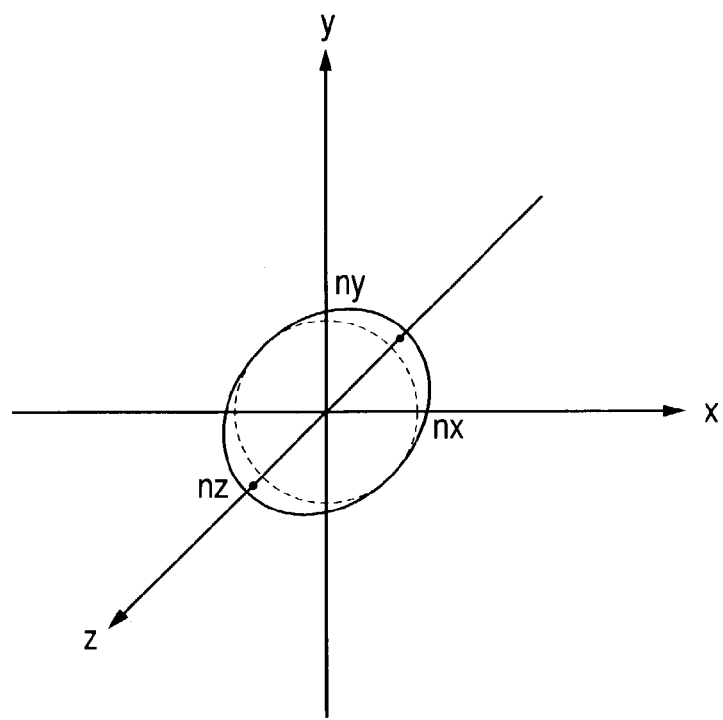
FIG. 10 is a view explaining a refractive index elliptic member.
Figure 11A:
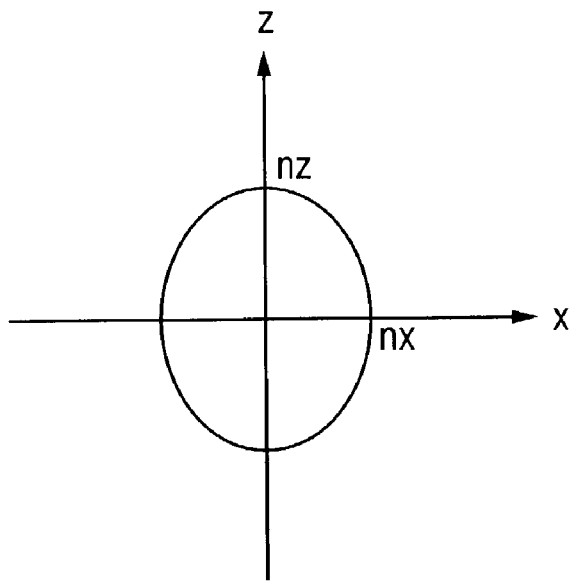
FIGS. 11A and 11B are views explaining the refractive index elliptic member.
Figure 11B:
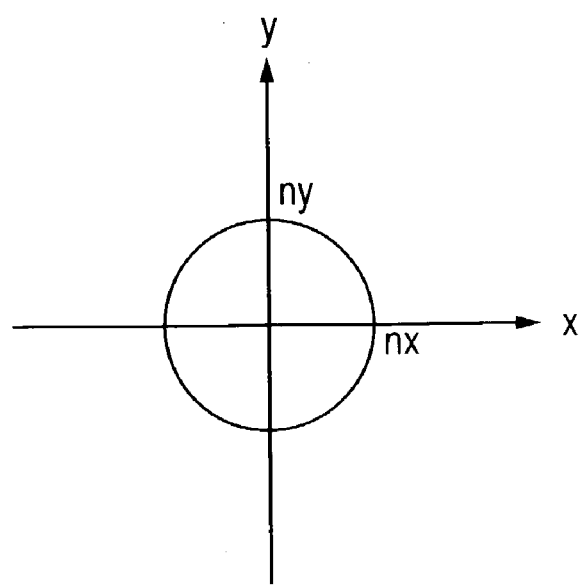
Figure 12:
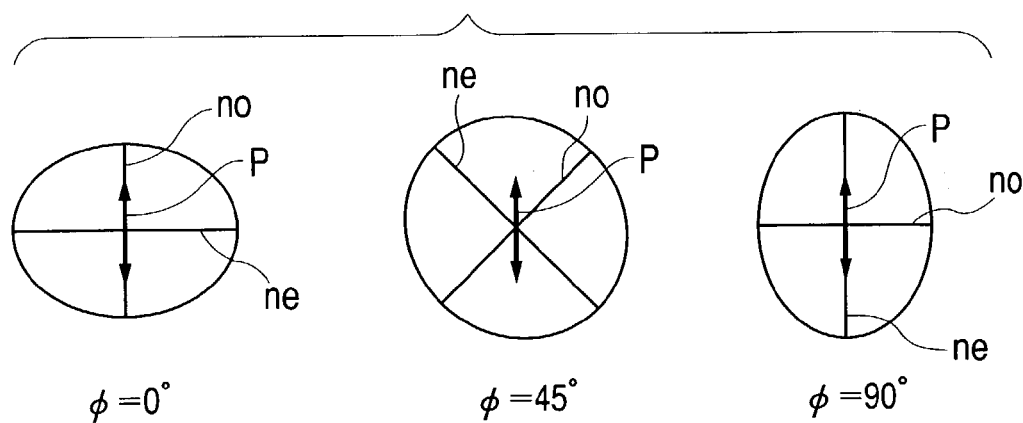
FIG. 12 is a view explaining anisotropy of the refractive index elliptic member with respect to incident light.
Figure 13:
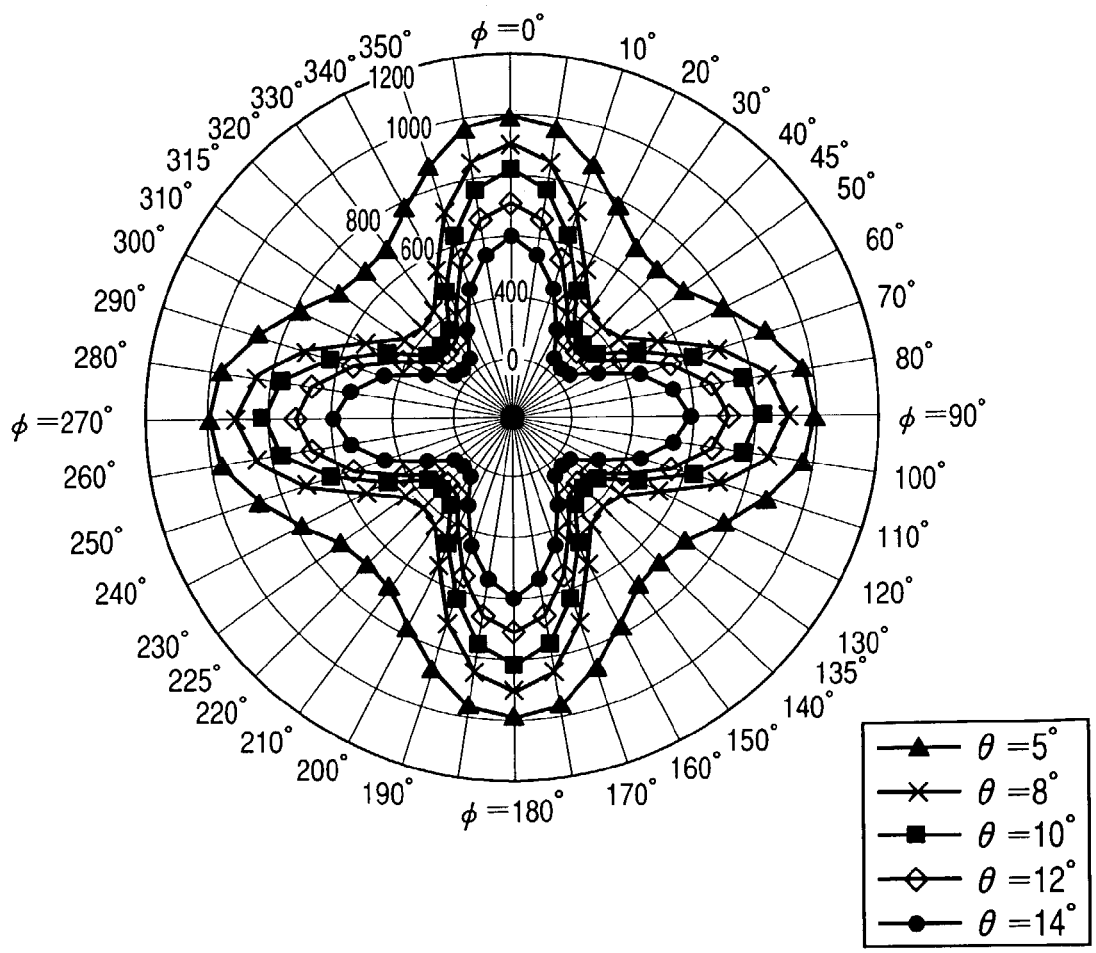
FIG. 13 is a view showing characteristics of the reflective liquid crystal display element.

FIG. 13 shows a result (contrast contour) of measuring contrast of the reflective liquid crystal display element by using the measuring apparatus of FIG. 8 (optical measurement system shown in FIGS. 8 and 9) to change an incident angle $\theta$ and an incident azimuth angle $\Phi$.

Figure 14:
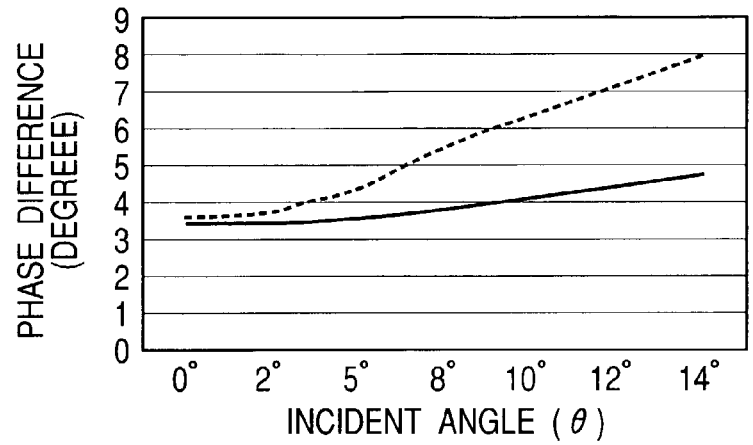
FIG. 14 is a view showing a phase difference in the reflective liquid crystal display element.

According to the result of the measurement, contrast value of an incident azimuth angle $\Phi$ and an incident azimuth angle $\Phi+90$ of the reflective liquid crystal display element are approximately equal and thus symmetrical. Contrast values of directions of incident azimuth angles $\Phi=45°, 135°, 225°, 315°$ are particularly low. Based on the contrast measurement result of FIG. 13, FIG. 14 shows phase differences $\Delta(\theta)$ (solid line), $\Delta 45(\theta)$ (dotted line) in case that the refractive liquid crystal display element is in a state displaying black, and FIG. 15 also shows a phase difference $\delta(\theta)$. An abscissa indicates an incident angle $\theta$, and an ordinate indicates a phase difference (represented by degree).

Figure 15:
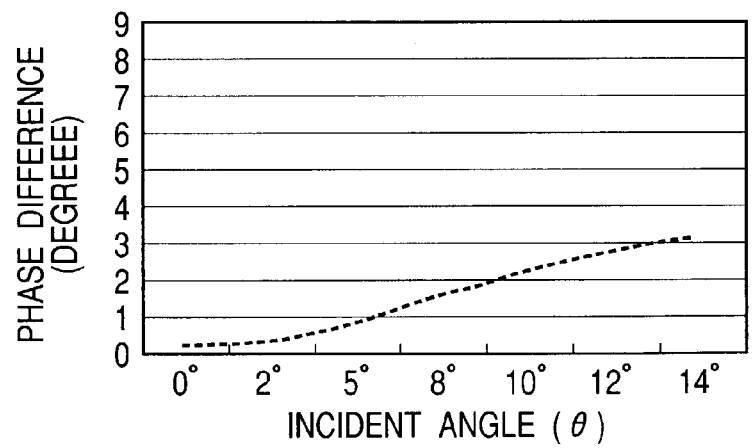
FIG. 15 is a view showing a phase difference $\delta(\theta)$
Figure 16:
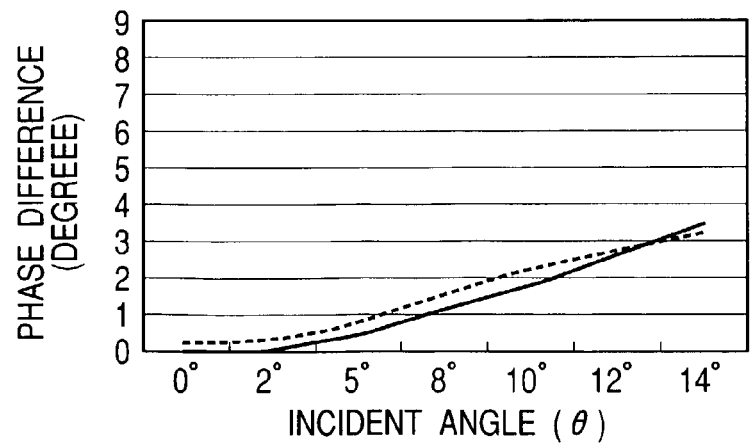
FIG. 16 is a view showing a phase difference of a double refraction filter.

Now, if a uniaxial refractive index elliptic member of a liquid crystal for generating a phase difference approximated to that of FIG. 15 is obtained, when a wavelength is λ=550 nm, a thickness of a liquid crystal layer d=2.5 µm (dp=2×d=5.0 µm), and refractive indexes of the refractive index elliptic member of the liquid crystal nx=1.5, nz=1.542 can be decided. FIG. 16 shows a phase difference of incident light of an incident azimuth angle Φ=45° (135°, 225°, 315°) in this uniaxial refractive index elliptic member of the liquid crystal. In FIG. 16, a solid line indicates a phase difference obtained from the uniaxial refractive index elliptic member by calculation, and a dotted line indicates a phase difference (phase difference of a minus code is represented by a plus code which reversely takes a minus code) obtained by the aforementioned measurement.

In the embodiment, the double refractive filter (double refractive phase difference compensation element) for compensating for the phase difference of the liquid crystal has a feature that when a wavelength is λ=550 nm, a thickness of the filter is d=2.5 µm (dc=2×d=5.0 µm), and refractive indexes of the refractive index ellipse of the filter are ncx=1.5, ncz=1.461.

In this case, an amount indicating a degree of anisotropy of the liquid crystal is δp=0.210, and amounts indicating degrees of anisotropy of the double refractive phase difference compensation element are δc=−0.195, δc/δp=−0.929.

According to the embodiment, by inserting the double refractive filter immediately before the reflective liquid crystal display element, the phase difference of the incident azimuth angle Φ=45° (135°, 225°, 315°) can be reduced to a reference phase difference, and thus it is possible to improve contrast.

Figure 17:
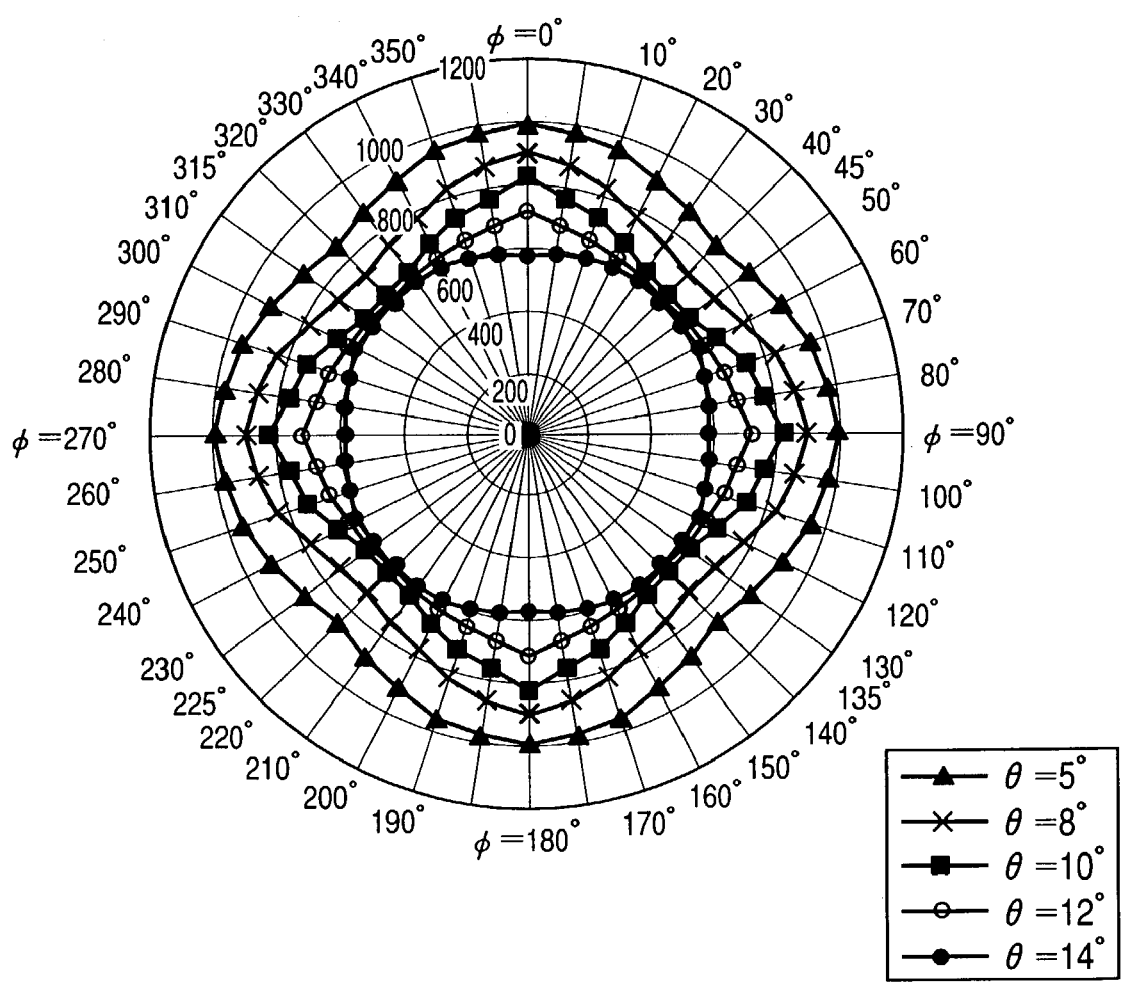
FIG. 17 is a view showing corrected characteristics of the first embodiment.

FIG. 17 shows a contrast value when the double refractive filter is inserted immediately before the reflective liquid crystal display element. In FIG. 17, contrast values are about 600 or higher at all azimuth angles Φ at an incident angle θ=14° or lower. Thus, it is possible to increase the contrast value in the reflective liquid crystal display element of the characteristics shown in FIG. 14.

(Second Embodiment)

A second embodiment of the present invention will be described.

A phase difference generated in the reflective liquid crystal display element is similar to that of FIG. 14. The embodiment uses a double refractive filter used for phase compensation element, which has a feature that when a wavelength is λ=550 nm, a thickness of the filter is d=2.5 µm (dc=2×d=5.0 µm), and refractive indexes of a refractive index ellipse are ncx=1.5, ncz=1.416.

In this case, an amount indicating a degree of anisotropy of a liquid crystal is δp=0.210, and amounts indicating degrees of anisotropy of the double refractive phase difference compensation element are δc=−0.420, δc/δp=−2.000.

According to the embodiment, by generating many phase differences at the double refractive filter and inserting this double refractive filter immediately before the reflective liquid crystal display element, the phase difference of the incident azimuth angle Φ=45° (135°, 225°, 315°) can be reduced better than a reference phase difference, and thus it is possible to improve contrast in illumination of rectangular luminous fluxes.

Figure 18:
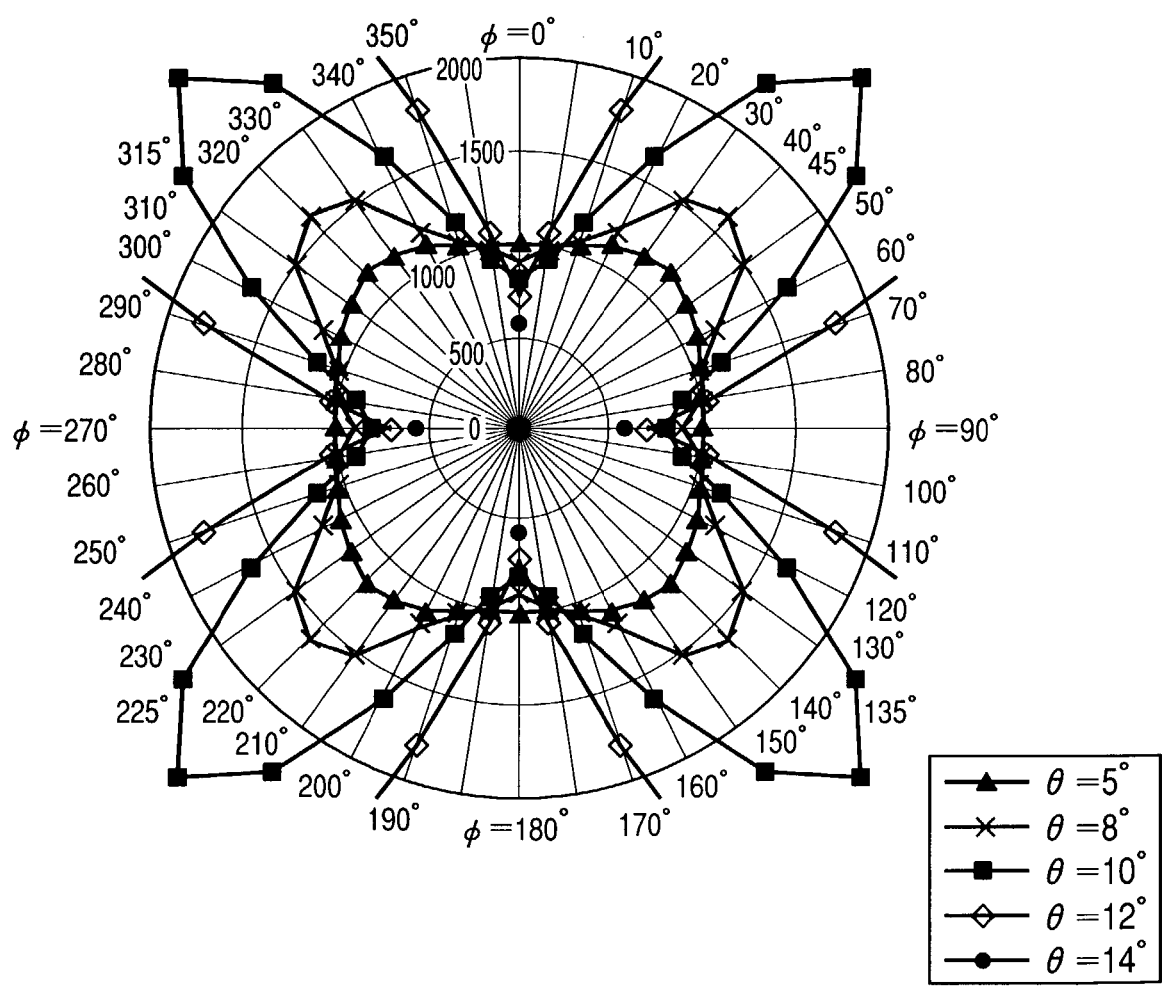
FIG. 18 is a view showing corrected characteristics of a second embodiment.

FIG. 18 shows a contrast value when the double refractive filter is inserted immediately before the reflective liquid crystal display element. In FIG. 18, a contrast value is about 1000 or higher at an azimuth angle Φ of a direction of 45° at an incident angle θ=14° or lower. Thus, it is possible to further increase the contrast value in the reflective liquid crystal display element. Incidentally, contrast values are 2000 or higher at Φ=45° at not shown incident angles θ=12°, 14°.

(Third Embodiment)

Figure 19:
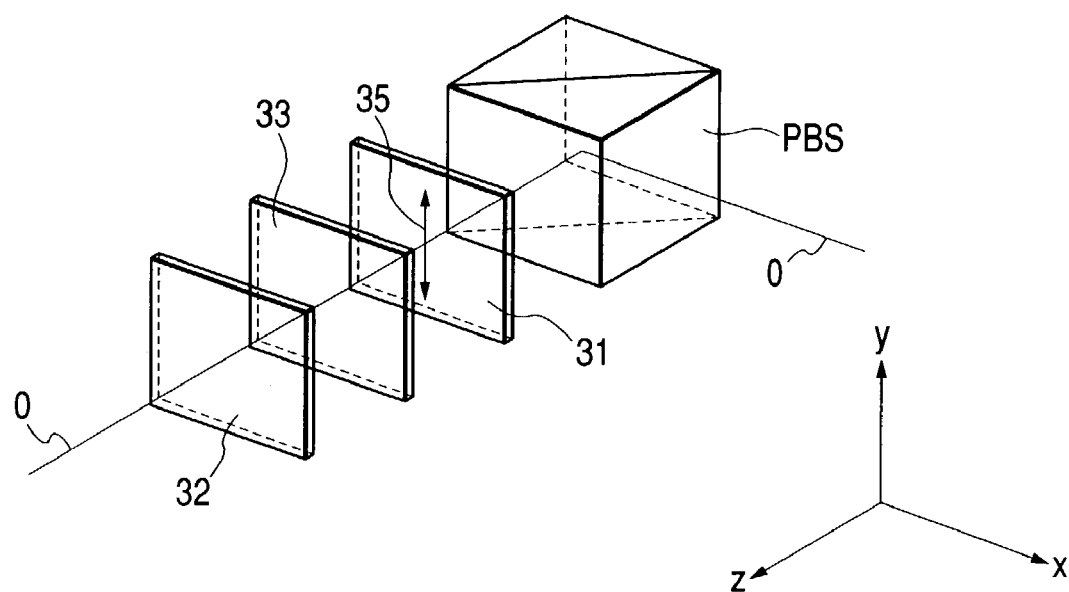
FIG. 19 is a view explaining a constitution of a third embodiment.
Figure 20:
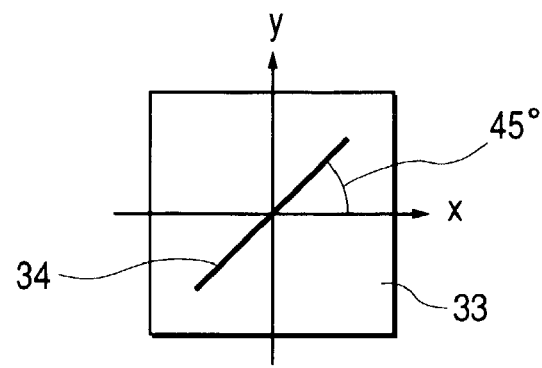
FIG. 20 is a view explaining a constitution of the third embodiment.

A third embodiment of the present invention will be described. According to the third embodiment, as shown in FIG. 19, a first uniaxial double refractive filter 32 (double refractive filter similar in characteristics to that of the first embodiment) of different refractive indexes in a direction of a z axis, and a second uniaxial double refractive filter 33 of different refractive indexes between an x axis and a y axis on an xy plane are used as double refractive phase difference compensation elements. As shown in FIG. 19, a constitution is adopted where a ¼ phase difference plate 31, the second uniaxial double refractive filter 33, and the first double refractive filter 32 are arranged in this order on an optical path stretched from a polarizing beam splitter PBS to a reflective liquid crystal display element (not shown). An advance phase axial direction (incident polarized light axial direction) 35 of the ¼ phase difference plate 31 is set in a reference direction of polarization (y axial direction in FIG. 19). In the case of the first uniaxial double refractive filter 32, an optical axis of anisotropy is set in a direction parallel to a reference axis O. The second double refractive filter 33 is a so-called phase difference plate, which adopts a constitution where an advance phase axial direction 34 is arranged obliquely to the reference direction of polarization as shown in FIG. 20.

According to the embodiment, a phase difference δ(θ) of a direction of an incident azimuth angle 45° is compensated for by the first double refractive filter 32, and a residual phase difference Δ(θ) is compensated for by the second double refractive filter 33, whereby further correction is made to improve contrast.

In the embodiment, the advance phase axis 34 of the second double refractive filter 33 is on the xy plane. If the advance phase 34 is inclined by 45 degrees with respect to the x axis, a polarizing axis 35 of light rays made incident on the reflective liquid crystal display element is in a Y axial direction irrespective of an incident angle θ and an incident azimuth angle Φ. Thus, an incident polarized light axial direction and an advance phase (delay phase) axial direction are always inclined by 45 degrees with respect to any light rays, generating equal phase differences.

Figure 21:
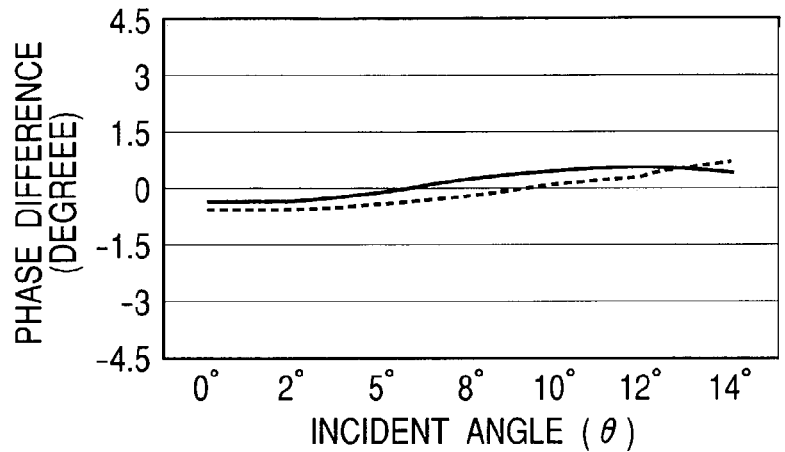
FIG. 21 is a view showing a corrected phase difference of the third embodiment.

As described above, the double refractive phase difference compensation element of the embodiment adopts a constitution where a phase difference δ' of the second double refractive filter 33 is set to −2.0 (degree), and the first double refractive filter 32 (similar in characteristics to the double refractive filter of the first embodiment) and the second double refractive filter 33 are combined. As shown in FIG. 21, a phase difference of polarized light by the double refractive phase difference compensation element becomes 1 degree or lower at a incident angle θ=14° or lower, whereby the phase difference can be reduced further. In FIG. 21, a solid line indicates a phase difference of a direction of an incident azimuth angle Φ=45° (135°, 225°, 315°), and a dotted line indicates a phase difference of a direction of an incident azimuth angle Φ=0° (90°, 180°, 270°).

Figure 22:
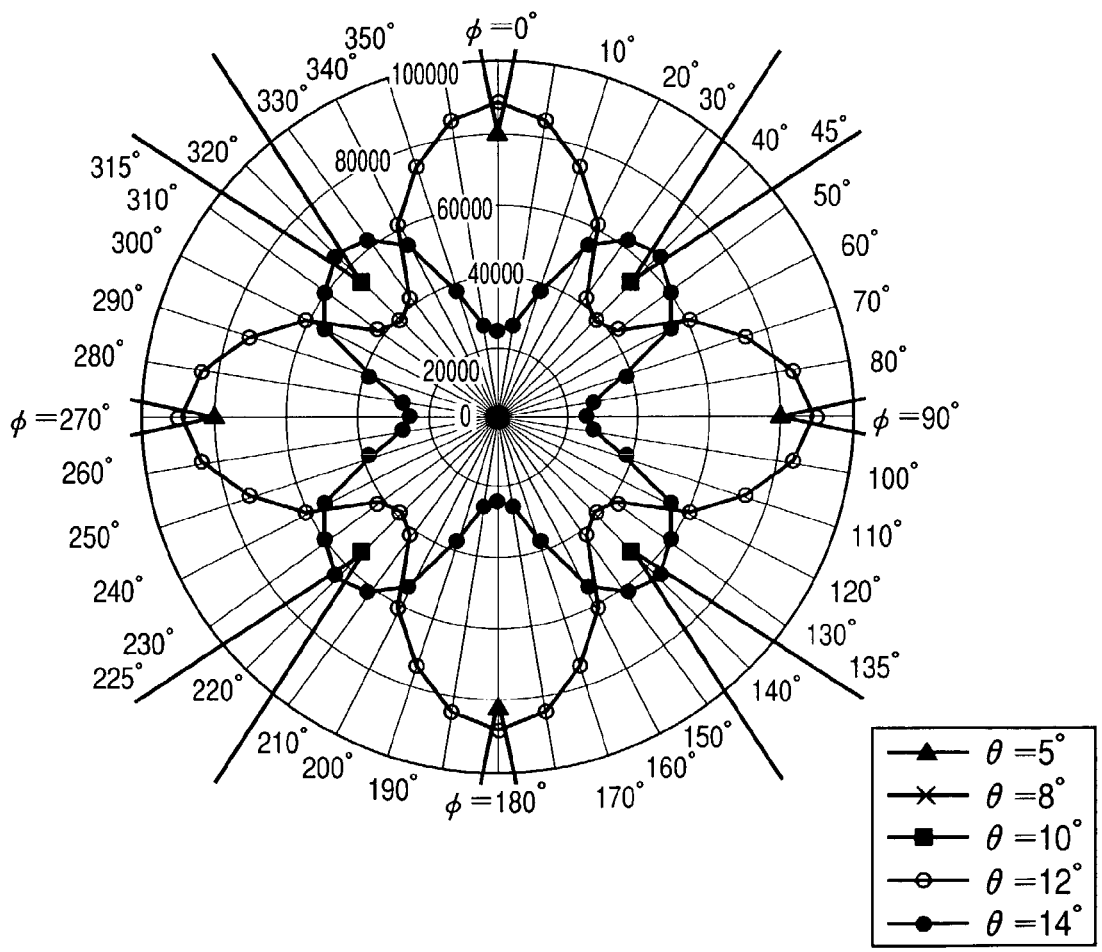
FIG. 22 is a view showing corrected characteristics of the third embodiment.

FIG. 22 shows a contrast value of the display apparatus of the embodiment. As shown in FIG. 22, when an incident angle of polarized light is θ=14° or lower, contrast values are 20000 or higher at all azimuth angles Φ, and thus it is possible to increase a contrast value of the reflective liquid crystal display element more effectively. In this case, incident angles θ=12°, 14° are not shown because of contrast values 100000 at all the azimuth angles Φ. Additionally, at an incident angle θ=5°, contrast values are 80000 or higher. At an incident angle θ=10°, contrast values are 53000 (Φ=45°) or higher at all the incident azimuth angles Φ. Contrast values of 100000 or higher are not shown. Further, since the phase difference of the incident azimuth angle Φ=45° of the incident angle θ=12° is larger than the phase difference of Φ=0°, a contrast value of Φ=0° is high. Conversely, however, since the phase difference of the incident azimuth angle Φ=45° of the incident angle θ=14° is smaller than the phase difference Φ=0°, a contrast value of Φ=45° is high.

(Fourth Embodiment)

A fourth embodiment of the present invention is an example of using a biaxial double refractive filter as a double refractive phase difference compensation element.

Figure 23:
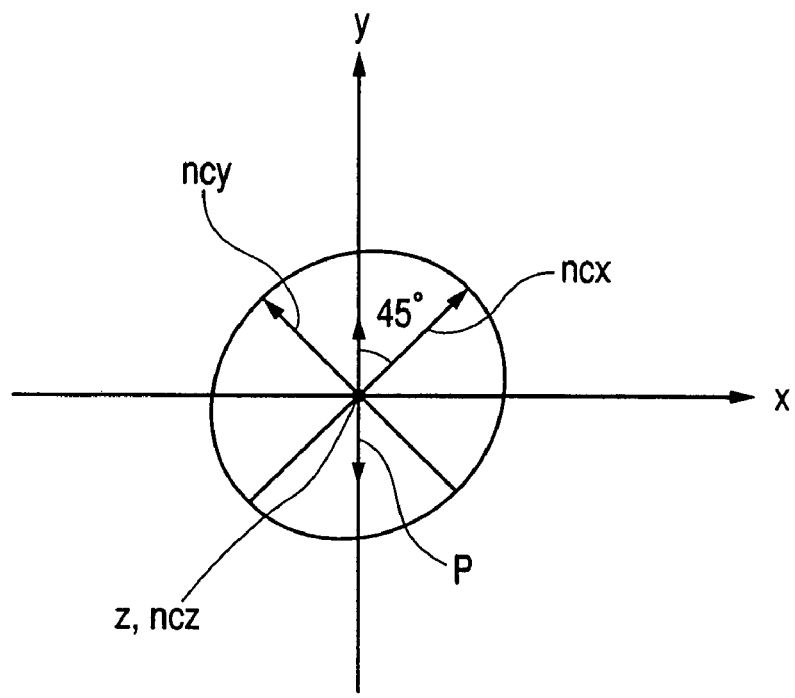
FIG. 23 is a view explaining a double refractive filter of a fourth embodiment.
Figure 24:
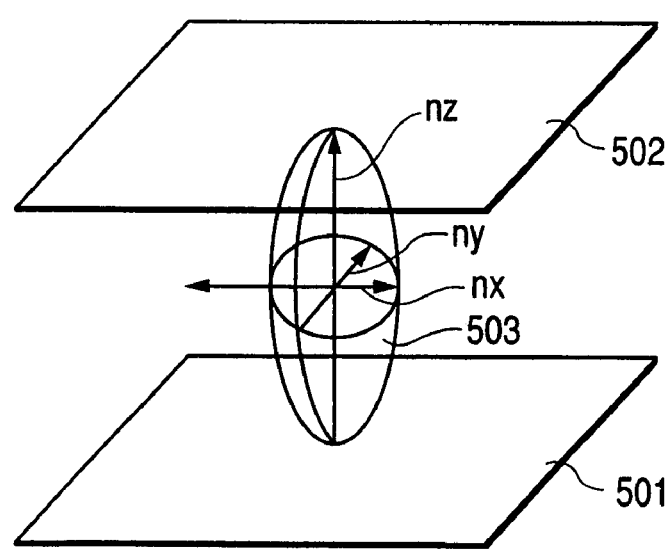
FIG. 24 is an explanatory view of a conventional example.
Figure 25:
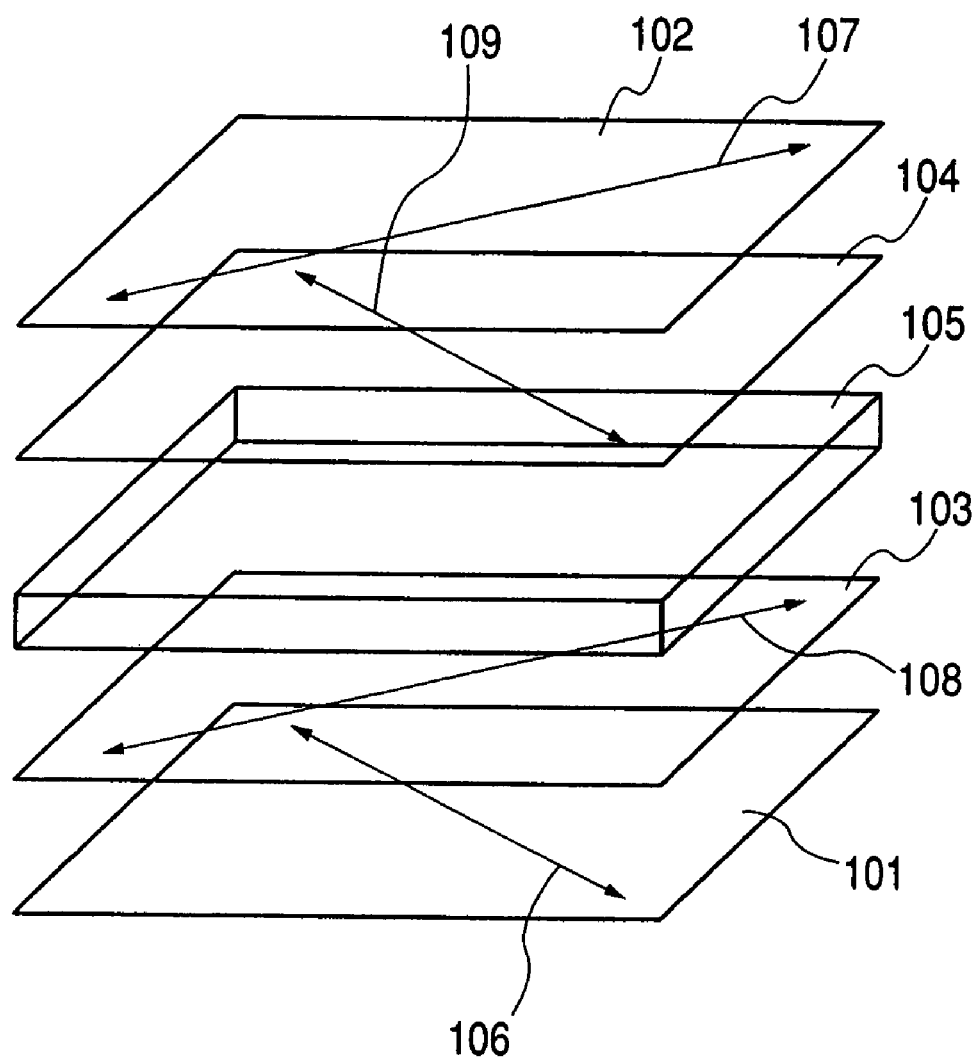
FIG. 25 is an explanatory view of a conventional example.

As shown in FIG. 23, a refractive index ellipse (biaxial) of the double refractive filter of the embodiment has refractive indexes, i.e., a refractive index ncz in a direction of a z axis, a refractive index ncx in a direction inclined by 45 degrees with respect to an x axis on an xy plane, and a refractive index ncy in a direction orthogonal to the direction of the refractive index ncx.

FIG. 23 shows a relation between an incident polarized light axial direction and a refractive index direction of the double refractive filter at an incident angle θ=0° for light rays made incident on the double refractive filter. A reference code p denotes an incident polarized light axial direction.

In this case, since the incident polarized light axial direction p is in a direction inclined by 45° with respect to the directions of refractive indexes ncx, ncy, a phase difference is generated. Thus, even at the incident angle θ=0°, it is possible to correct a phase difference generated in the reflective liquid crystal display element.

A phase difference (degree) of light made incident on the reflective liquid crystal display element of the black displaying state described above with reference to FIG. 14 is δ'=3.430.

Thus, as a double refractive filter for compensating for the phase difference generated in the reflective liquid crystal display element of the black displaying state, a double refractive film is used having a feature that when a wavelength of light made incident on the double refractive filter is λ=550 nm, a thickness of the filter is d=2.5 µm (dc=2×d=5.0 µm) and refractive indexes of the refractive index ellipse of the filter are nx=1.50105, ny=1.5, nz=1.461. When this double refractive filter is used, a phase difference (degree) δ" generated by the double refractive filter at an incident angle θ=0° is the following:

δ"=−3.430

By using the double refractive filter, the phase difference δ' generated in the reflective liquid crystal display element of the black displaying state can be canceled, and thus it is possible to further improve contrast.

The embodiments of the image projector have been described based on the example of FIG. 1. However, the present invention is not limited to the constitution of the optical system of FIG. 1 as long as a constitution is adopted where illumination light is guided through the polarizing beam splitter to the reflective liquid crystal display element, and the light reflected by the reflective liquid crystal display element is transmitted again through the polarizing beam splitter to the projection lens.

(Fifth Embodiment)

Next, description will be made of an attaching structure of the double refractive filter when the image projector of the present invention is constituted by referring to FIGS. 26 to 29.

Each of FIGS. 26 to 29 shows a structure of fixing the polarizing beam splitter, the ¼ phase difference plate, the double refractive filter and the reflective liquid crystal display element of the image display apparatus of the present invention which optical constitution is shown in FIG. 1. In these drawings, as an example, a structure regarding a constitution of the optical paths of green light denoted by the reference numerals 9a, 11g, 12g, 13g of FIG. 1 is shown. Also in the other optical paths of red and blue, by a constitution similar to the following constitution of the optical paths of the green light, the image display apparatus can be realized more specifically.

Figure 26:
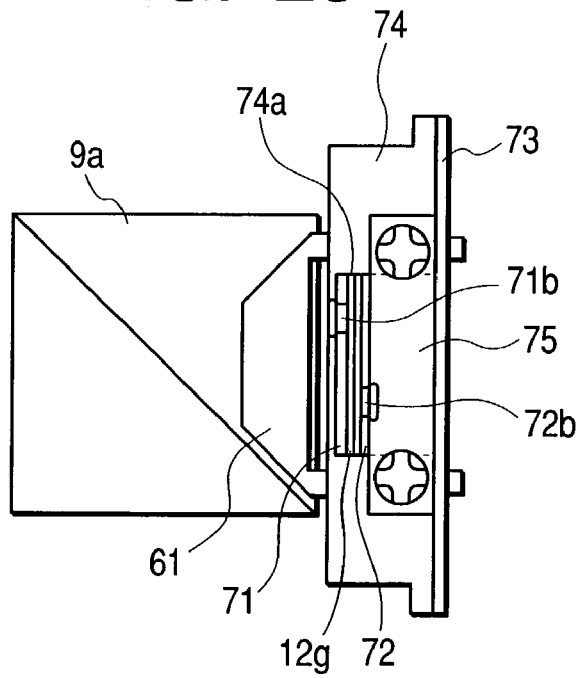
FIG. 26 is a view of a polarizing beam splitter of a green optical path of the embodiment seen from the above.
Figure 27:
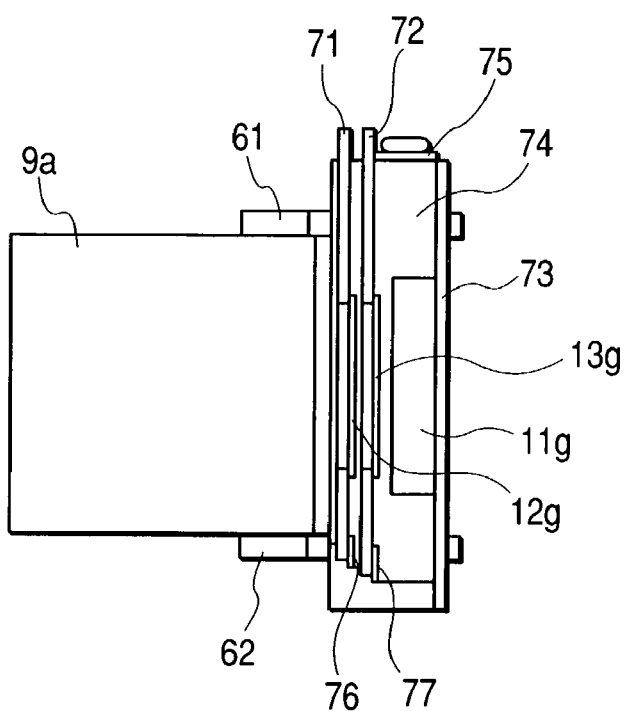
FIG. 27 is a view of the polarizing beam splitter of the green optical path of the embodiment seen from the side.

FIG. 26 shows the polarizing beam splitter of the green optical path seen from above, and FIG. 27 shows a section of its side.

In FIGS. 26 to 29, components similar to those of FIG. 1 are denoted by similar reference numerals. In FIGS. 26 to 29, a reference numeral 9a denotes a polarizing beam splitter, 11g a reflective liquid crystal display element, 12g a ¼ phase difference plate, and 13g a double refractive filter. Reference numerals 61, 62 denotes first and second attaching plates, and 71 a first holding frame for holding the ¼ phase difference plate 12g. A reference numeral 72 denotes a second holding frame for holding the double refractive filter 13g, and 73 a liquid crystal holder for holding the reflective liquid crystal display element. A reference numeral 74 denotes a cover, and 75 a first pressing plate. Reference numerals 76, 77 denote second and third pressing plates.

The ¼ phase difference plate 12g can secure plane accuracy by sticking a ¼ phase difference film to a glass substrate. Similarly, the double refractive filter 13g can secure plane accuracy by sticking a double refractive film to the glass substrate. Additionally, first and second surfaces of the ¼ phase difference plate 12g and the double refractive filter 13g are subjected to reflection prevention treatment by reflection prevention coating or sticking a film having a reflection prevention effect.

The first and second attaching plates 61 and 62 are made of metallic materials such as iron and nickel alloys, and respectively have first and second extension portions (not shown). The first and second attaching plates 61 and 62 are adhered and fixed to the polarizing beam splitter 9a by UV cure adhesive.

The first holding frame 71 is made of a metallic material such as phosphor bronze, and its surface is subjected to painting or the like so as to become black.

Figure 29:
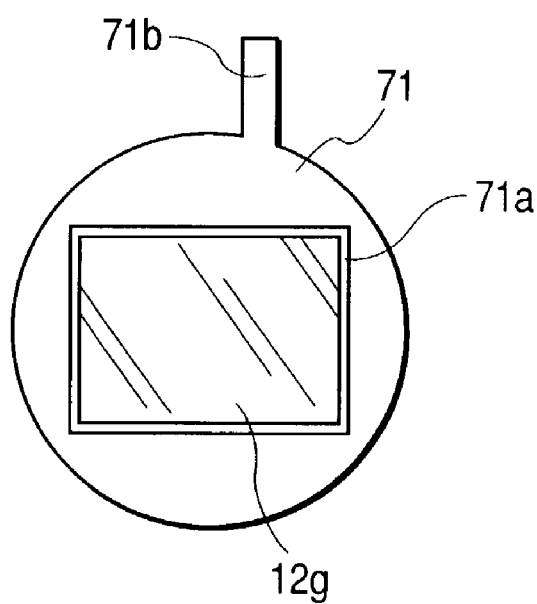
FIG. 29 is a view explaining a fixing structure of a ¼ phase difference plate of the embodiment to the holding frame.

The first holding frame 71 has a roughly circular shape, and includes an opening 71a and an extension portion 71b as shown in FIG. 29.

The ¼ phase difference plate 12g is fixed to the first holding frame 71 by means such as adhesion as shown in FIG. 29.

The second holding frame 72 is made of a metallic material such as phosphor bronze, and its surface is subjected to painting or the like so as to become black.

Figure 28:
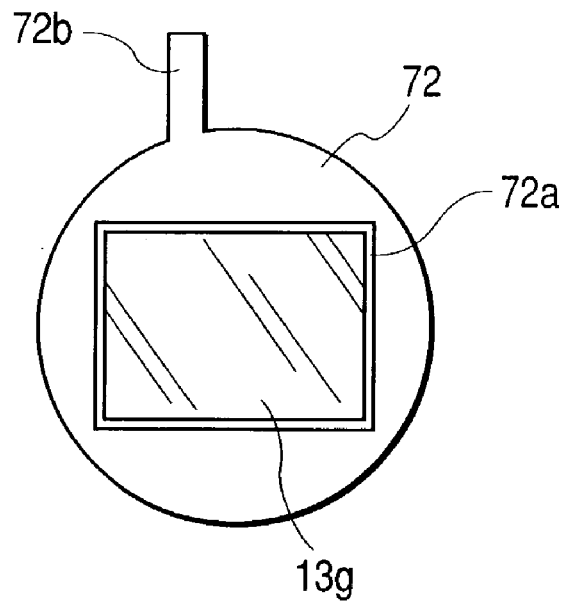
FIG. 28 is a view explaining a fixing structure of the double refractive filter of the embodiment to a holding frame.

The second holding frame 72 has a roughly circular shape, and includes an opening 72a and an extension portion 72b as shown in FIG. 28.

The double refractive filter 13g is fixed to the second holding frame 72 by means such as adhesion as shown in FIG. 28.

The reflective liquid crystal display element 11g is a well-known liquid crystal display element, and fixed to the liquid crystal holder 73 by means such as adhesion.

The liquid crystal holder 73 is made of, e.g., aluminum, and includes first to fourth holes (not shown) set in a fitting relation with the first and second extension portions (not shown) of the first and second attaching plates 61 and 62 by predetermined clearances.

The cover 74 is made of, e.g., polycarbonate plastic or a metallic material such as aluminum, and has reception portions inside which are fitted to hold the outer peripheral portions of the first and second holding frames 71 and 72 so that the first and second holding frames 71 and 72 can be rotated in predetermined ranges. Additionally, positions of the first and second holding frames 71 and 72 are regulated by, e.g., the second and third pressing plates 76 and 77 made of phosphor bronze in a direction of an optical axis.

The cover 74 further includes first to fourth holes (not shown) penetrated by the first and second extension portions (not shown) of the first and second attaching plates 61 and 62.

Further, a notch 74a is disposed in the upper part of the cover 74 as shown in FIG. 26. The extension portions 71b, 72b of the first and second holding frames 71 and 72 are projected to the outside of the cover 74 as shown in FIG. 27. In FIG. 28, the extension portion 72b of the second holding frame 72 is shown for easier explanation. As apparent from FIG. 26, the extension portion 71b of the first holding frame and the extension portion 72b of the second holding frame are not overlapped.

The cover 74 is fixed to the liquid crystal holder 73 by not-shown screws.

Additionally, in the cover 74, the first pressing plate 75 made of, e.g., phosphor bronze, is fixed by means such as screws.

The aforementioned liquid crystal holder 73 is adjusted so as to position the reflective liquid crystal display element 11g approximately in a center, coincide with panel pixels of other colors on the projection screen, and focus on the projection screen, and fixed by filling the first to fourth holes (not shown) bored in the liquid crystal holder 73 and the first and second extension portions (not shown) of the first and second attaching plates 61 and 62 with adhesive and sticking the same.

The ¼ phase difference plate 12g is fixed by sticking the extension portion 71b of the first holding frame 71 to the cover 74 in a position where the extension portion 71b of the first holding frame 71 is rotated, and for example black displaying becomes darkest.

Further, the double refractive filter 13g is fixed by sticking the extension portion 72b of the second holding frame 72 to the first pressing plate 75 in a position where the extension portion 72b of the second holding frame 72 is rotated, and for example contrast becomes largest when white and black displaying is carried out in the reflective liquid crystal display element.

By forming such a constitution in the reflective display element of the blue optical path and the reflective display element of the red optical path, the image display element of the embodiment can obtain high contrast.

Moreover, by optimizing both of the ¼ phase difference film and the double refractive film in accordance with a waveform of transmitted light, higher contrast can be obtained.

According to the foregoing embodiments, the contrast reduction caused by the phase difference generated by the reflective liquid crystal display element is effectively compensated for, and thus a high-contrast image projector can be provided.

What is claimed is:

1. A display apparatus comprising:
    a reflective liquid crystal display element;
    an illumination optical system adapted to illuminate said reflective liquid crystal display element by light from a light source; and
    a projection optical system adapted to project light from said reflective liquid crystal display element,
    wherein said illumination optical system includes a reflector adapted to reflect light from said light source;
    a lens array adapted to separate light reflected by said reflector into a plurality of luminous fluxes;
    a condenser optical system adapted to superpose said plurality of luminous fluxes onto said reflective liquid crystal display element;
    a polarizing beam splitter adapted to guide light of predetermined polarizing direction of light from said condenser optical system onto said reflective liquid crystal display element, analyze light reflected by said reflective liquid crystal display element, and guide light analyzed by said polarizing beam splitter onto said projection optical system; and
    a ¼ phase difference plate and a double refractive phase compensation element disposed between said polarizing beam splitter and said reflective liquid crystal display element and arranged in this order, and
    wherein said double refractive phase compensation element is arranged so that a smallest refractive index axial direction of said double refractive phase compensation element is in parallel to an optical axis of said illumination optical system.

2. The display apparatus according to claim 1, wherein a phase advance (phase delay) axis of the ¼ phase difference plate is arranged to be vertical or parallel to a reference plane of polarization of said polarizing beam splitter, and a smallest refractive index axial direction of the double refractive phase compensation element is arranged to be parallel to a reference axis of the illumination light.

3. The display apparatus according to claim 1, wherein the double refractive phase compensation element satisfies $-0.8 > \delta c/\delta p > -3.0$, when refractive indexes of respective main axial directions of a refractive index elliptic member indicating anisotropy of the double refractive phase compensation element are ncx, ncy, ncz, the following relations are established:

$ncz < ncx$, and $ncz < ncy$, when a thickness of the double refractive phase compensation element is defined to be $d_1$ ($dc = 2 \times d_1$), and an amount indicating a degree of anisotropy of the double refractive phase compensation member is defined to be $\delta c$, the following is established:

$\delta c = (ncz - (ncx + ncy)/2) \times dc$, and when an amount indicating a degree of anisotropy of said reflective liquid crystal display element is defined to be $\delta p$, a thickness of a liquid crystal layer is defined to be $d_2$ ($dp = 2 \times d_2$), and refractive indexes of main axial directions of a refractive index elliptic member of the liquid crystal layer are defined to be nx, ny, nz (nz is a plane normal direction, nx==ny), the following is established:

$\delta p = (nz - nx) \times dp$

4. A display apparatus comprising:

a reflective liquid crystal display element;

an illumination optical system adapted to illuminate said reflective liquid crystal display element by light from a light source; and a projection optical system adapted to project light from said reflective liquid crystal display element, wherein said illumination optical system includes a reflector adapted to reflect light from said light source;

a lens array adapted to separate light reflected by said reflector into a plurality of luminous fluxes;

a condenser optical system adapted to superpose said plurality of luminous fluxes onto said reflective liquid crystal display element;

a polarizing beam splitter adapted to guide light of predetermined polarizing direction of light from said condenser optical system onto said reflective liquid crystal display element, analyze light reflected by said reflective liquid crystal display element, and guide light analyzed by said polarizing beam splitter onto said projection optical system; and a ¼ phase difference plate and a double refractive phase compensation element disposed between said polarizing beam splitter and said reflective liquid crystal display element, and wherein said double refractive phase compensation element is arranged so that a smallest refractive index axial direction of said double refractive phase compensation element is in parallel to an optical axis of said illumination optical system.

5. A display apparatus comprising:

first and second reflective liquid crystal display elements illuminated by illumination light emerging from the polarization beam splitter; and an illumination optical system adapted to illuminate the first and second reflective liquid crystal display elements, wherein the illumination optical system includes:

a polarization beam splitter including a polarization splitting surface;

a first double refractive phase compensation element arranged between the polarization beam splitter and the first reflective liquid crystal display element;

a second double refractive phase compensation element arranged between the polarization beam splitter and the second reflective liquid crystal display element;

a first ¼ phase difference plate disposed between the polarization beam splitter and the first reflective liquid crystal display element; and a second ¼ phase difference plate disposed between the polarization beam splitter and the second reflective liquid crystal display element, wherein the first double refractive phase compensation element is so arranged that a smallest refractive index axial direction of the first double refractive phase compensation element is in parallel to a reference plane including a normal of the polarization splitting surface and an optical axis of the illumination optical system, and wherein the second double refractive phase compensation element is so arranged that a smallest refractive index axial direction of the second double refractive phase compensation element is in parallel to the reference plane.

6. A display apparatus according to claim 5, further comprising:

a third reflective liquid crystal element illuminated by the illumination light, and wherein the illumination optical system, further includes:

another polarization beam splitter; and a third double refractive phase compensation element arranged between the another polarization beam splitter and the third reflective liquid crystal display element, wherein the third double refractive phase compensation element is so arranged that a smallest refractive index axial direction of the third double refractive phase compensation element is in parallel to the reference plane.

7. A display apparatus comprising:

first and second reflective liquid crystal display elements illuminated by illumination light emerging from the polarization beam splitter;

an illumination optical system adapted to illuminate the first and second reflective liquid crystal display elements, a third reflective liquid crystal element illuminated by the illumination light, wherein the illumination optical system includes:

a polarization beam splitter including a polarization splitting surface;

a first double refractive phase compensation element arranged between the polarization beam splitter and the first reflective liquid crystal display element;

a second double refractive phase compensation element arranged between the polarization beam splitter and the second reflective liquid crystal display element;

a first ¼ phase difference plate disposed between the polarization beam splitter and the first reflective liquid crystal display element;

a second ¼ phase difference plate disposed between the polarization beam splitter and the second reflective liquid crystal display element;

another polarization beam splitter; and a third double refractive phase compensation element arranged between the another polarization beam splitter and the third reflective liquid crystal display element, wherein the first double refractive phase compensation element is so arranged that a smallest refractive index axial direction of the first double refractive phase compensation element is in parallel to a reference plane including a normal of the polarization splitting surface and an optical axis of the illumination optical system, wherein the second double refractive phase compensation element is so arranged that a smallest refractive index axial direction of the second double refractive phase compensation element is in parallel to the reference plane, wherein the third double refractive phase compensation element is so arranged that a smallest refractive index axial direction of the third double refractive phase compensation element is in parallel to the reference plane, and wherein the illumination optical system further includes a third ¼ phase difference plate disposed between the another polarization beam splitter and the third reflective liquid crystal display element.

8. A display apparatus comprising:
first and second reflective liquid crystal display elements illuminated by illumination light emerging from the polarization beam splitter;
a third reflective liciuid crystal element illuminated by the illumination light; and
an illumination optical system adapted to illuminate the first and second reflective liquid crystal display elements,
wherein the illumination optical system includes,
a polarization beam splitter;
another polarization beam splitter;
a first double refractive phase compensation element arranged between the polarization beam splitter and the first reflective liquid crystal display element,
a second double refractive phase compensation element arranged between the polarization beam splitter and the second reflective liquid crystal display element;
a third double refractive phase compensation element arranged between the another polarization beam splitter and the third reflective liquid crystal display element; and
a ¼ phase difference plate disposed between the another polarization beam splitter and the third reflective liciuid crystal display element;
wherein the first double refractive phase compensation element is so arranged that a smallest refractive index axial direction of the first double refractive phase compensation element is in parallel to a first optical axis of the illumination optical system between the polarization beam splitter and the first reflective liquid crystal display element;
wherein the second double refractive phase compensation element is so arranged that a smallest refractive index axial direction of the second double refractive phase compensation element is in parallel to a second optical axis of the illumination optical system between the polarization beam splitter and the second reflective crystal liquid display element; and
wherein the third double refractive phase compensation element is so arranged that a smallest refractive index axial direction of the third double refractive phase compensation element is in parallel to a third optical axis of the illumination optical system between the another polarization beam splitter and the third reflective crystal liciuid display element.

9. A display apparatus according to claim 5, wherein the illumination optical system further includes;
a second ¼ phase difference plate disposed between the polarization beam splitter and the first reflective liquid crystal display element; and
a third ¼ phase difference plate disposed between the polarization beam splitter and the second reflective liquid crystal display element.

\* \* \* \* \*